United States Patent [19]
Warren et al.

[11] Patent Number: 5,963,909
[45] Date of Patent: *Oct. 5, 1999

[54] MULTI-MEDIA COPY MANAGEMENT SYSTEM

[75] Inventors: Robert L. Warren, Cardiff; Chong U. Lee, San Diego; Kamran Moallemi, Del Mar, all of Calif.

[73] Assignee: Solana Technology Development Corporation, San Diego, Calif.

[ * ] Notice: This patent is subject to a terminal disclaimer.

[21] Appl. No.: 08/977,719

[22] Filed: Nov. 25, 1997

Related U.S. Application Data

[63] Continuation-in-part of application No. 08/712,900, Sep. 12, 1996, Pat. No. 5,719,937
[60] Provisional application No. 60/008,287, Dec. 6, 1995.

[51] Int. Cl.⁶ ................................ H04L 9/00; H04L 9/14
[52] U.S. Cl. .................................... 705/1; 705/14; 380/4; 380/5; 380/49; 360/60; 386/94
[58] Field of Search ............................ 705/1, 14; 380/3, 380/4, 49, 5; 386/94; 455/26.1; 360/60; 340/825.31; 395/186

[56] References Cited

U.S. PATENT DOCUMENTS

| | | | |
|---|---|---|---|
| 4,644,422 | 2/1987 | Bedini | 360/60 |
| 4,965,680 | 10/1990 | Endoh | 360/60 |
| 4,979,210 | 12/1990 | Nagata et al. | 380/3 |
| 5,113,437 | 5/1992 | Best et al. | 380/3 |
| 5,144,658 | 9/1992 | Takahashi | 380/3 |
| 5,148,482 | 9/1992 | Bocci et al. | 380/48 |
| 5,161,210 | 11/1992 | Druyvesteyn et al. | 704/200 |
| 5,185,800 | 2/1993 | Mahieux | 704/500 |
| 5,231,546 | 7/1993 | Shimada | 360/60 |
| 5,319,735 | 6/1994 | Preuss et al. | 704/205 |
| 5,394,274 | 2/1995 | Kahn | 360/27 |
| 5,420,866 | 5/1995 | Wasilewski | 370/426 |
| 5,453,968 | 9/1995 | Veldhuis et al. | 369/84 |
| 5,490,170 | 2/1996 | Akagiri et al. | 375/240 |
| 5,592,651 | 1/1997 | Rackman | 711/163 |
| 5,687,191 | 11/1997 | Lee et al. | 375/216 |
| 5,719,937 | 2/1998 | Warren et al. | 380/4 |

FOREIGN PATENT DOCUMENTS 0 506 394  9/1992  European Pat. Off. .

*Primary Examiner*—James P. Trammell
*Assistant Examiner*—Cuong H. Nguyen
*Attorney, Agent, or Firm*—Barry R. Lipsitz; Ralph F. Hoppin

[57] ABSTRACT

Reproduction of a multi-media data signal which is stored on a source media or distributed via a communication network is controlled by inserting master tag data and control tag data into the data signal. A player/recorder inserts an additional generation of control tag information each time a copy of the media is made. If the number of generations of the control tag information is above a threshold value, reproduction of the data signal may be inhibited. For example, if the data signal comprises video data, the player/recorder may only allow playing of the video signal on a display but will not allow recording. The playing and recording of associated signals, such as an audio signal which accompanies a video signal, may also be controlled. The master tag data and control tag data may be provided as spread spectrum signals which are spectrally shaped and power-adjusted according to the data signal to render them imperceptible in the data signal. With encrypted frames of multi-media data, encryption keys may be carried in a key layer with the encrypted data signal or another data signal for use in decryption on a frame by frame basis.

103 Claims, 11 Drawing Sheets

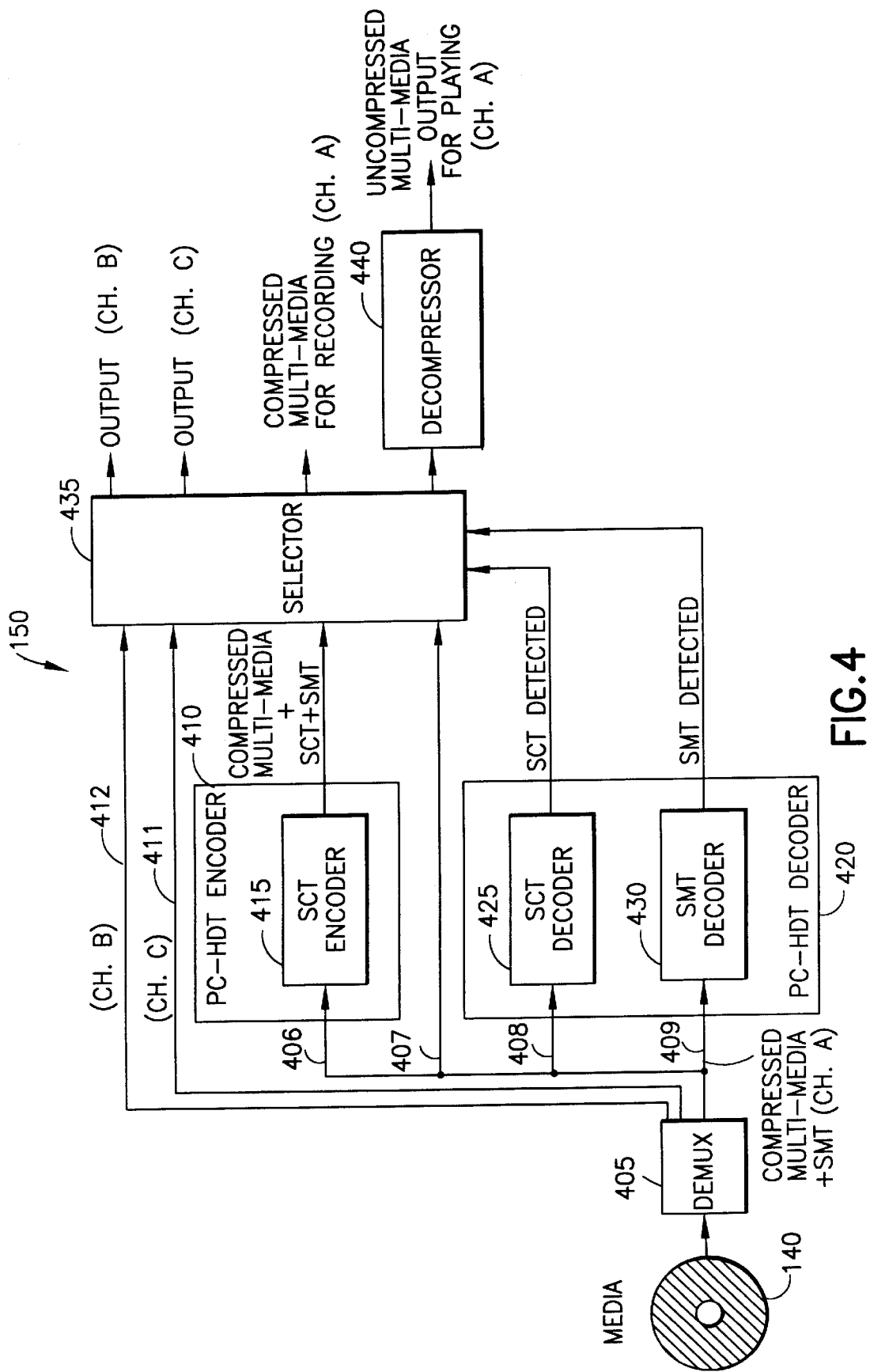

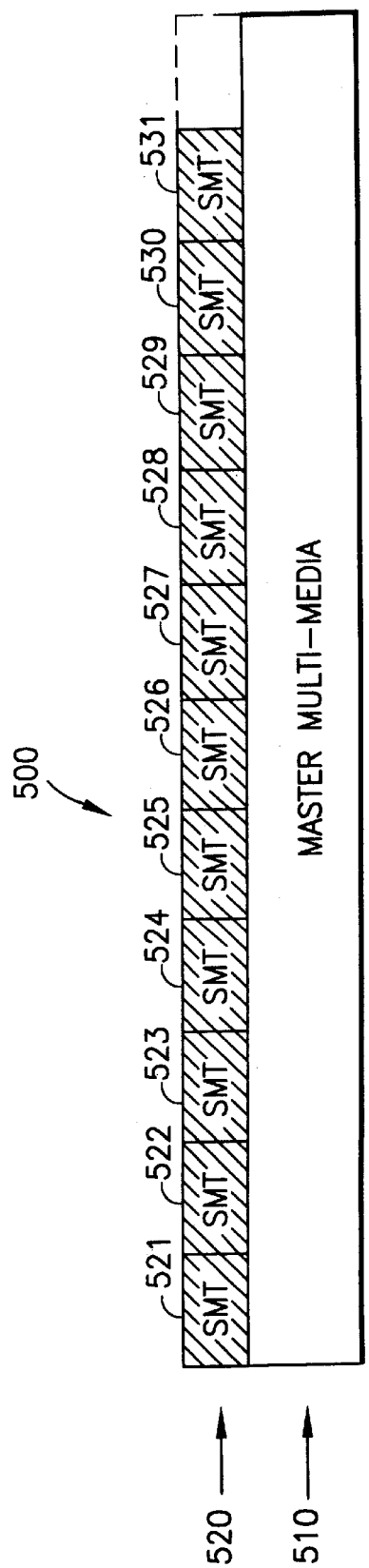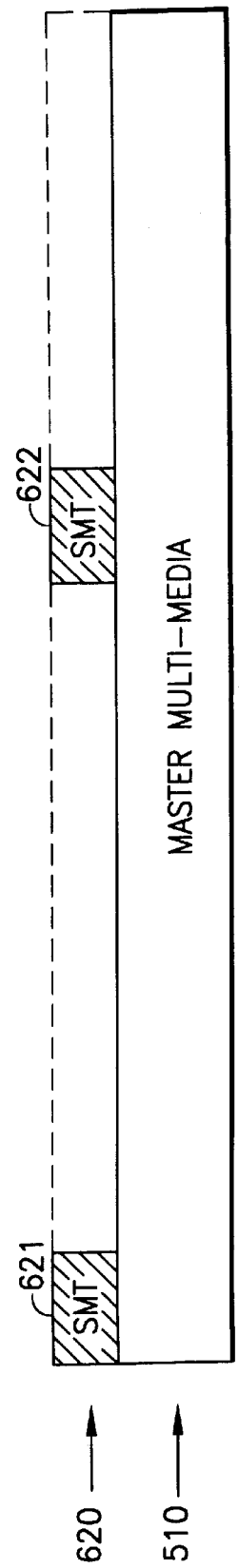

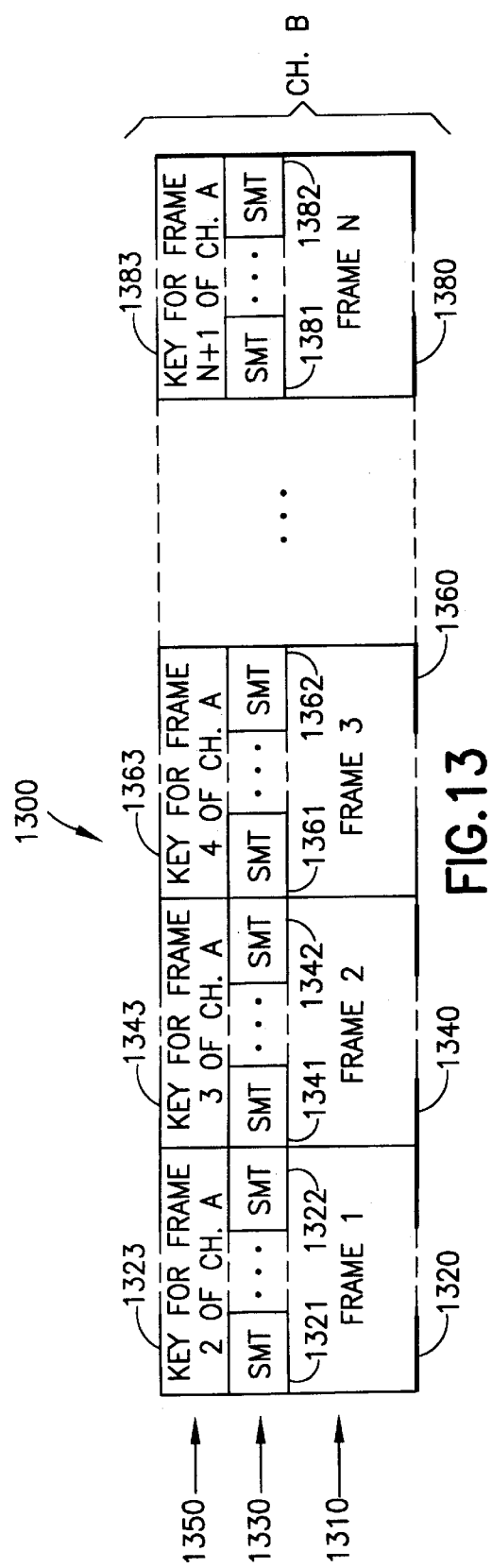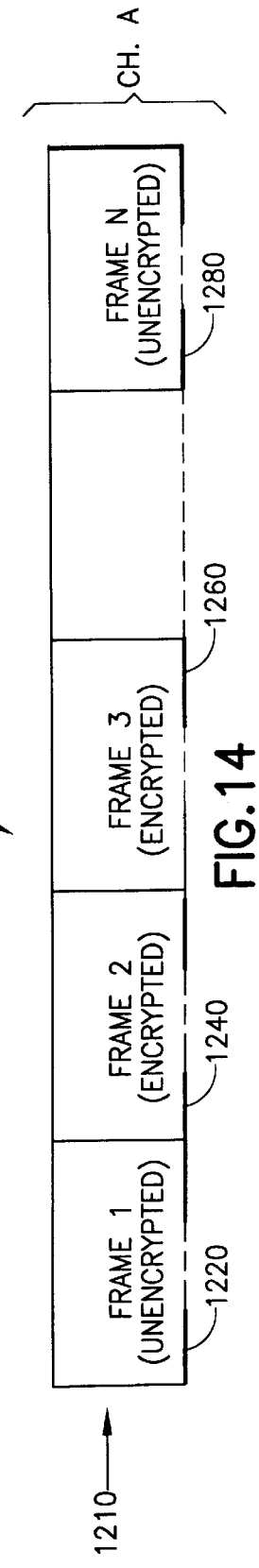

MULTI-MEDIA COPY MANAGEMENT SYSTEM

BACKGROUND OF THE INVENTION

This application claims the benefit of U.S. Provisional Application No. 60/008,287, filed Dec. 6, 1995, which is a C-I-P of Ser. No. 08/712,900 filed Sep. 12, 1996, U.S. Pat. No. 5,719,397.

The present invention relates to a method and apparatus for providing electronic copy management of various forms of multi-media data. The invention is particularly suitable for controlling the reproduction of video and/or audio entertainment programs which are carried over a communication network or in a portable storage medium such as a compact disc (CD) or digital video disk (DVD).

Currently, there is a growing need to protect the proprietary rights of entertainment companies and others who distribute electronic programming services to individuals and the public at large. This includes television programming service providers and other entertainment and educational service providers such as the music industry and the software industry. Each of these service providers distribute video, audio, audio/video, and other data via a network including terrestrial, satellite, or cable networks, the Internet and intranets.

Additionally, the data is commonly stored on permanent or temporary storage media which is distributed, for example, through retail and other point-to-point sales. These storage media include magnetic tapes, such as audio cassettes, video cassettes, and computer floppy disks, and optical media, such as CDs, DVDs and laser discs.

However, it is problematic that the proprietary data can be copied onto blank storage media and distributed without the permission of the service provider, thereby significantly reducing sales for the service provider. Additionally, the proprietary data may be altered in quality or in substance.

Accordingly, it would be desirable to provide an electronic copy management system for controlling the reproduction of proprietary data which is distributed via a communication network or distributed on a storage medium in point-to-point sales. The management system should allow the control of the number of generations of authorized copies which may be made. That is, the system should allow no copies, a limited number of generations of copies, or an unlimited number of generations of copies. Moreover, the system should provide an option for gradual degradation of the data as additional generations of copies are made. The system should thwart attempts by unauthorized tamperers (e.g., pirates) to defeat the system, and should be substantially imperceptible to the authorized user.

The system should provide the capability to track the source of an unauthorized copy by tagging the copy with a unique identification number such as a player or recorder serial number.

The system should accommodate both encrypted and clear multi-media data. For encrypted multi-media data, a capability should be provided to carry the encryption key as an embedded layer of the encrypted multi-media data. Alternatively, a capability should be provided to carry the encryption key as an embedded layer of another multi-media signal, for example, which is stored on media with the encrypted multi-media data or obtained from another source.

The present invention provides a system having the above and other advantages.

SUMMARY OF THE INVENTION

In accordance with the present invention, a method and apparatus are presented for controlling the reproduction of a multi-media data signal which is stored on a source media or distributed via a communication network.

The apparatus includes a receiver for receiving and detecting master tag information which is embedded in a data signal of the source media at the time of manufacture or during distribution. The receiver also detects control tag information which may be present in the data signal, and, determines the number of generations of the control tag information. An encoder provides an additional generation of control tag information in the data signal, and a data output stage selectively reproduces the data signal for recording and/or playing based on the number of generations of control tag information. In particular, the data output stage may be prevented from reproducing the data signal when a predetermined number of generations of the control tag information is present in the data signal.

Moreover, the encoder is also responsive to the master tag information for providing the additional generation of control tag information, and, in the absence of master tag information, the additional generation of control tag information may not be provided. Thus, the encoder is also compatible with data signals that are not copy protected according to the present invention. Alternatively, the additional generations of control tag information may replace the master tag information.

The data signal may include a plurality of data channels, in which case the encoder may provide the control tag information and the master tag information in the different data channels. The data signal may include cryptographic data to enable the decryption of data packets carried together with the data signal. The data signal may comprise compressed digital data, where the encoder provides the additional generation of control tag information without decompressing the compressed digital data.

The control tag and master tag information may be provided as spread spectrum signals, and may be spectrally shaped and power-adjusted according to the data signal to render them substantially imperceptible in the data signal. Moreover, the master tag data and control tag data may be provided in one or more layers of the data signal as spread spectrum signals. For example, the master tag information may be provided in at least one time segment of the data signal, while the control tag information is provided in the data signal in non-overlapping time segments. In this case, both the control tag and master tag may use the same, non-shifted pseudo-random sequence.

Alternatively, orthogonal or otherwise distinct spread spectrum signals may be used for the master tag information and control tag information.

Moreover, the control tag and master tag information may be provided in a plurality of non-adjacent time segments in the same layer of the data signal.

Furthermore, in a graceful degradation scheme of the present invention, the encoder provides the additional generation of control tag information at a level which is calculated to cumulatively degrade the quality of the data signal according to the number of generations of control tag information. That is, as additional generations of copies are made, the quality or fidelity of the underlying data signal is reduced.

In an alternative embodiment, an apparatus is presented for controlling the reproduction of a primary multi-media data signal using an auxiliary multi-media data signal. Master tag information is embedded in one or both of the primary and auxiliary multi-media data signals, and one or both of the primary and auxiliary multi-media data signals are adapted to carry control tag information embedded therein. The data output stage is responsive to the number of generations of control tag information for selectively reproducing the primary multi-media data signal, and, optionally, the auxiliary multi-media data signal.

The primary and auxiliary multi-media data signals may be carried on a common source media, such as a DVD.

The primary multi-media data signal may comprises one or more frames of multi-media data which are encrypted under corresponding encryption keys, while the auxiliary multi-media data signal comprises an encryption key layer with packets containing the corresponding encryption keys such that each packet contains an encryption key for decrypting one or more corresponding data frames of the primary multi-media data signal. For example, the encryption keys for an encrypted video signal may be carried with the accompanying audio data.

An encryption key may be used to decrypt any number of associated data frames of the primary multi-media data signal, whether the associated data frames are previous, concurrent, and/or subsequent to the packet with the encryption key. A buffering capability may be provided to temporarily store the associated encrypted data frames until the encryption key is available, or to store the encryption key until the encrypted data frames are available. Moreover, one encryption key may be carried in more than one packet.

Corresponding methods are also presented.

BRIEF DESCRIPTION OF THE DRAWINGS

FIG. 4 is a block diagram of a player/recorder for use with the encoding system of FIG. 3 in accordance with the present invention.

FIG. 5 is a block diagram of a multi-media data stream with a continuously encoded sequence of a standard master tag in accordance with the present invention.

FIG. 6 is a block diagram of a multi-media data stream with a periodically encoded sequence of a standard master tag in accordance with the present invention.

FIG. 13 is a block diagram of a multi-media data stream having a sequence of frames, a standard master tag layer, and an encryption key layer for use in decoding the multi-media data stream of FIG. 14 in accordance with the present invention.

FIG. 14 is a block diagram of a multi-media data stream having a sequence of encrypted and unencrypted frames in accordance with the present invention.

DETAILED DESCRIPTION OF THE INVENTION

Figure 1:
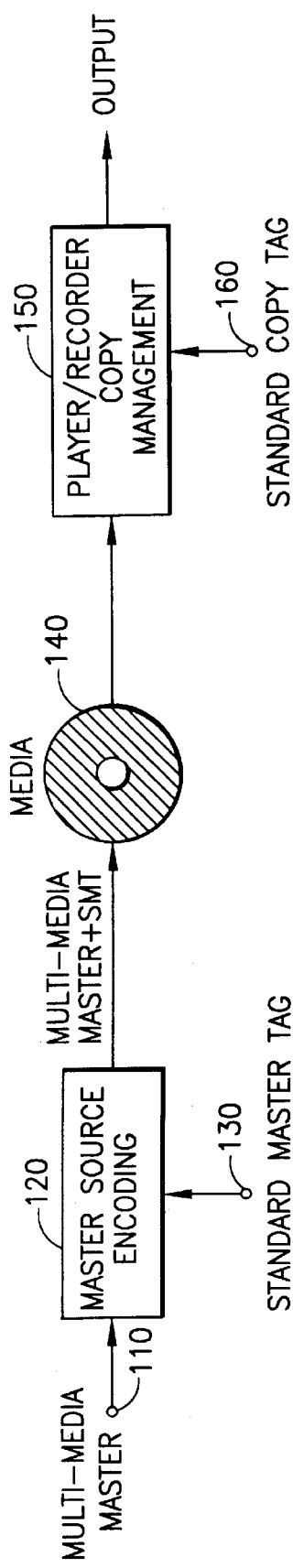
FIG. 1 is a block diagram of an overview of a copy management system in accordance with the present invention.

A method and apparatus are presented for providing electronic copy management of various forms of multi-media data. In one embodiment, any source material that has at least a single multi-media channel, such as a video channel, can take advantage of the invention. Moreover, the distribution format is not limiting and can include any number of means including those discussed herein.

"Multi-media" is defined herein to include one or more types of media data, such as video, audio, or other data. For example, a video data signal alone is considered to be a multi-media signal, as is an audio data signal alone, or some other data signal alone, such as a data stream providing text, numerical or other information.

The present invention is compatible with a scheme such as Hidden Data Transport (HDT) which is described in PCT application WO 97/09797 to C. Lee, et al., entitled "Method and Apparatus for Transmitting Auxiliary Data in Audio Signals", published Mar. 13, 1997, incorporated herein by reference. For audio applications, the invention is also compatible with audio tagging technology such as that disclosed in U.S. Pat. No. 5,319,735 to R. Preuss et al., also incorporated herein by reference.

Furthermore, the invention may employ both digital and analog multi-media signals, and may use a scheme such as Post-Compression Hidden Data Transport (PC-HDT) as described in U.S. Pat. No. 5,687,191 to C. Lee, et al., entitled "Post-Compression Hidden Data Transport", issued Nov. 11, 1997, incorporated herein by reference, and U.S. patent application Ser. No. 08/912,434, filed Aug. 18, 1997, also incorporated herein by reference, to provide copy management for compressed digital video and/or audio streams such as those which follow the MPEG, Musicam, and Dolby AC-2 and AC-3 formats.

Tag data is generated, inserted, and detected in a data signal which is to be copy managed according to a spread spectrum technique such as, for example, HDT and PC-HDT. With these techniques, data to be carried by a signal (e.g., a video or audio signal) is spectrally shaped to closely approximate the spectral shape of the signal, and is combined with the signal at a level where it is substantially imperceptible.

For example, for video applications, the tag data should not noticeably affect the perceived video image. This requires the consideration of factors including human vision, as well as the particular video encoding method used. For video encoding which uses frequency domain transforms, such as the Discrete Cosine Transformation, the tag data can be provided with high-frequency transform coefficients, which are less noticeable to the viewer than low-frequency coefficients. For tag data in audio data, the tag data should be inaudible, or otherwise provided at an acceptable level.

The advantages of using HDT and PC-HDT algorithms over other technologies include the capability for real-time encoding and decoding of a data stream, the ability to add multiple layers of tag data at different times, cross-compatibility with encoding and decoding of HDT and PC-HDT data, the ability to modulate an information bit stream on tag data (e.g., a player/recorder serial number), and higher data rates than previously available.

FIG. 1 is a block diagram of an overview of a copy management system in accordance with the present invention. The Multi-Media Copy Management System (MCM system) consists of two stages. The first stage is implemented at the master source level and consists of embedding a Standard Master Tag (SMT) into a data source such as a multi-media master signal. For example, the multi-media master signal may be a video signal. The multi-media master signal is received via terminal 110 and provided to a master source encoding unit 120. The encoding unit 120 receives an SMT data signal via terminal 130.

The encoding unit 120 outputs a combined signal which includes the multi-media master data and the SMT data. The combined signal may be stored on media 140 such as a disc, cassette, electronic audio files, or the like. Alternatively, the combined signal may be transmitted over a communication network, not shown.

The second stage of the MCM system is implemented in a player/recorder copy management unit 150. The player/recorder 150 receives a Standard Copy Tag (SCT) data signal via a terminal 160. The player/recorder unit 150 searches the combined signal which is stored on the media to detect the presence of SMT data which was inserted by the encoding unit 120 and/or SCT data which may have been previously inserted by the player/recorder 150. Specifically, if SMT data is detected, then the player/recorder will know that the media 140 is protected by the MCM system of the present invention. Moreover, the number of generations of SCT data which are detected on the media 140 will inform the player/recorder 150 of the number of copied media from which the particular media 140 was derived. For example, if the media 140 is a second generation copy, that means an original media was copied to a first media, and the first media was copied to a second media. By comparing this generation number with a permitted threshold value, which may be provided by the SMT data, the output of the player/recorder can be muted or blanked to control the further reproduction of the data of the media 140. That is, all or a portion of the output, whether audio, video and/or other data can be controlled.

Moreover, while the MCM system disclosed in FIG. 1 may provide copy management of an audio signal in one embodiment, the SMT and SCT data may also be used to provide copy management of any accompanying data signal or other related program material. For example, if the media 140 included a movie with separate video and a audio channels, reproduction of the audio signal at the player/recorder 150 may also be inhibited according to the SMT and SCT data which was detected in the video channel. Moreover, if the media includes a number of movies with separate respective video and audio channels, the SMT and SCT data of one or more of the video channels may control the reproduction of all data on the media 140. Furthermore, the SMT and SCT data may be carried in a channel which is not copy-protected, or the SMT and SCT data may be carried in two or more channels. The player/recorder 150 is discussed in greater detail in connection with FIG. 4.

Preferably, encoding of the master source which is input to the encoder 120 of FIG. 1 occurs prior to mass production of the distributed material (e.g., media 140). This is accomplished by the encoder adding SMT data to a digital or analog master tape or digital stream, which may be compressed or uncompressed. Moreover, when SMT data is embedded in a video data stream, it is desirable to spectrally shape the SMT data and provide it at an amplitude level so that it is visually imperceptible in the video stream. For audio data, the SMT data should be spectrally shaped and provided at an amplitude level so that it is substantially inaudible. In this manner, the fidelity of the multi-media data is not noticeably diminished.

Moreover, tag data can be carried in a data signal that is not perceptible at all to humans, such as a carrier signal that provides a data signal via a cable television system, satellite broadcast system, telephone network, or other communication network.

Although not necessary, it may be desirable to use the same SMT for all the source material which is produced on the same type of media. For example, all audio CDs may use a first SMT, while all audio/video DVDs use a second SMT, all broadcast television programs use a third SMT, and so forth. This makes it easier for the player/recorder 150 to detect the SMT by avoiding the need to search for numerous possible SMTs and maintain a data base of available SMTs. However, the use of a number of different SMTs may allow a manufacturer to better track the source of an unauthorized copy by cross-referencing the SMT with the distribution channel (e.g., geographic region, retail store, Internet site), and/or the distribution date. Thus, the SMT data may include information such as a unique source identification number as well as the number of authorized copies which may be made of the data stream carried by the media 140.

Advantageously, when using HDT or PC-HDT, the SMT data may be provided according to a reserved continuous pseudo-noise (PN) sequence, or multiple repetitions of the same PN sequence. Moreover, various modifications of this scheme may be used. For example, instead of using a continuous PN sequence, one may use a burst of a PN sequence, a repetitive PN sequence, a non-repetitive continuous PN sequence, a non-continuous PN sequence, a PN sequence having a length which exceeds the length of the SMT or other tag data, or any combination thereof. Other alternatives and modifications will become apparent to those skilled in the art.

Various spread spectrum signal configurations may be used to provide the tag data discussed herein, including a single, non-repeating PN sequence, one or more repeating PN sequences, or a bursty PN sequence.

Furthermore, as discussed in U.S. Pat. No. 5,687,191, a "sparse" PN sequence, "sample twiddling" sequence, and/or "bit twiddling" sequence may be used. With a sparse PN sequence, a pseudo-random sequence is generated which comprises mostly zeros, but with values of +1 and −1, for example, randomly interspersed. The sparse PN sequence is added at specific locations known to the PC-HDT encoder and decoder.

A sample twiddling sequence is generated in cooperation with the sparse PN sequence. Specifically, subband samples from the data stream are pseudo-randomly selected. For example, assume four bits in two's complement notation are used to represent a subband sample with value "+5" (e.g., 0101 in binary). Then, the current sparse PN sequence value, which is independently generated, is added to the subband sample to create a new data carrier sequence.

A bit twiddling sequence is also generated in cooperation with a sparse PN sequence. A subband sample from the data stream is pseudo-randomly selected. For example, assume again that four bits (in two's complement notation) are used to represent a subband sample with value "+5" (e.g., 0101 in binary). Then, the current status of the sparse PN sequence is added to the least significant bit (LSB) of the binary representation of the subband sample.

Furthermore, the PN sequence may optionally be modulated with a low rate information layer, which may uniquely identify the source material by providing an identifier which is similar to a universal product code (UPC) or other standard code used on consumer goods. The modified compressed video stream is then recorded on each and every disc (e.g., media 140) along with any audio signal and/or data stream that may accompany it.

Moreover, the SMTs and/or SCTs may be used to carry additional data in a binary signaling scheme. That is, the presence or absence of an SMT data packet in a defined interval of the copy managed data stream may indicate a zero or one data bit. A sequence of zeros and ones can be accumulated and decoded by the player/recorder to derive the desired data. Thus, additional data can be carried beyond the data of the SCTs and SMTs themselves.

Figure 2:
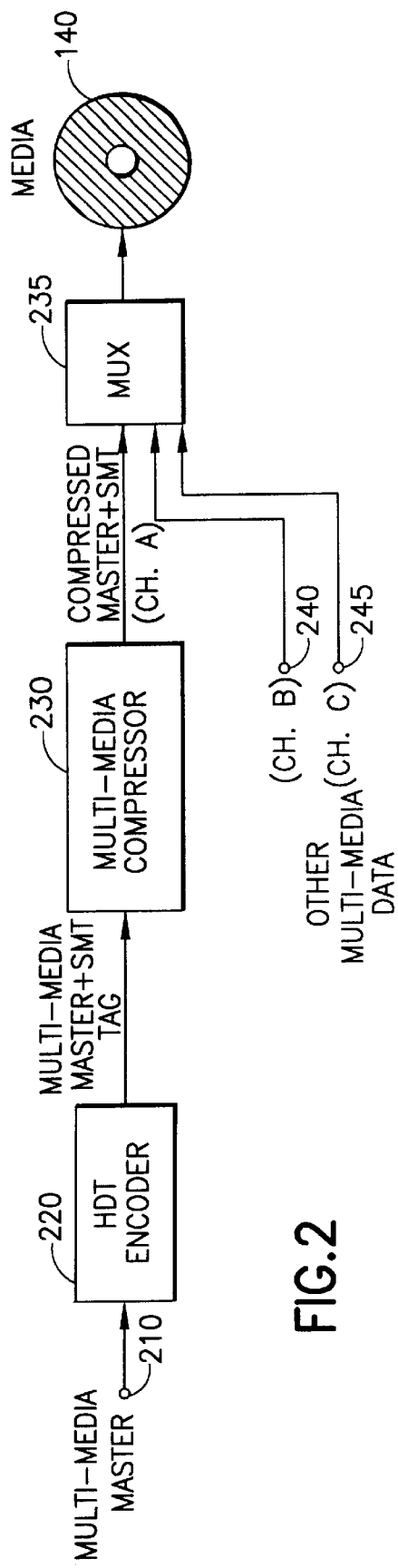
FIG. 2 is a block diagram of a master source encoding system with encoding before compression in accordance with the present invention.

FIG. 2 is a block diagram of a master source encoding system with encoding before compression in accordance with the present invention. Multi-media master data is received via a terminal 210 and provided to an HDT encoder 220. The HDT encoder 220 inserts SMT data into an uncompressed multi-media master signal and provides the combined signal to a multi-media compressor 230 for compression. For example, if the multi-media master contains pixel video data (e.g., luminance and chrominance data), the multi-media compressor 230 may compress the data using a spatial transformation, quantization, run-length coding, and other known video compression techniques.

Other multi-media data which accompanies the multi-media master data may also be received and multiplexed with the multi-media master data at multiplexer 235. For example, a first auxiliary multi-media data signal, designated channel B (CH. B) is received at a terminal 240, while a second auxiliary multi-media data signal, designated channel C (CH. C) is received at a terminal 245. The multi-media master data signal is designated channel A (CH. A). Channel A may be considered a primary multi-media signal whose reproduction is controlled. The auxiliary multi-media data signals are not required, of course. Moreover, any number of auxiliary multi-media data signals may be provided.

For example, when channel A is a video signal of a movie, channel B may be the accompanying audio, and channel C may carry text data for subtitles. Alternatively, channels B and C may carry multiple audio tracks for high-fidelity reproduction, or for alternate language subtitles. Channels B and C may carry other data, such as a free computer video game that is provided with a feature length movie, or data for other promotional purposes such as "electronic coupons". The multiplexed signal is then stored on the media 140.

As mentioned, it is desirable to add the SMT data to the master audio signal prior to manufacturing a large number of media units 140 which are mass marketed to consumers. This avoids the need to insert the SMT data into each media unit 140 separately, thereby resulting in significant production efficiencies.

Figure 3:
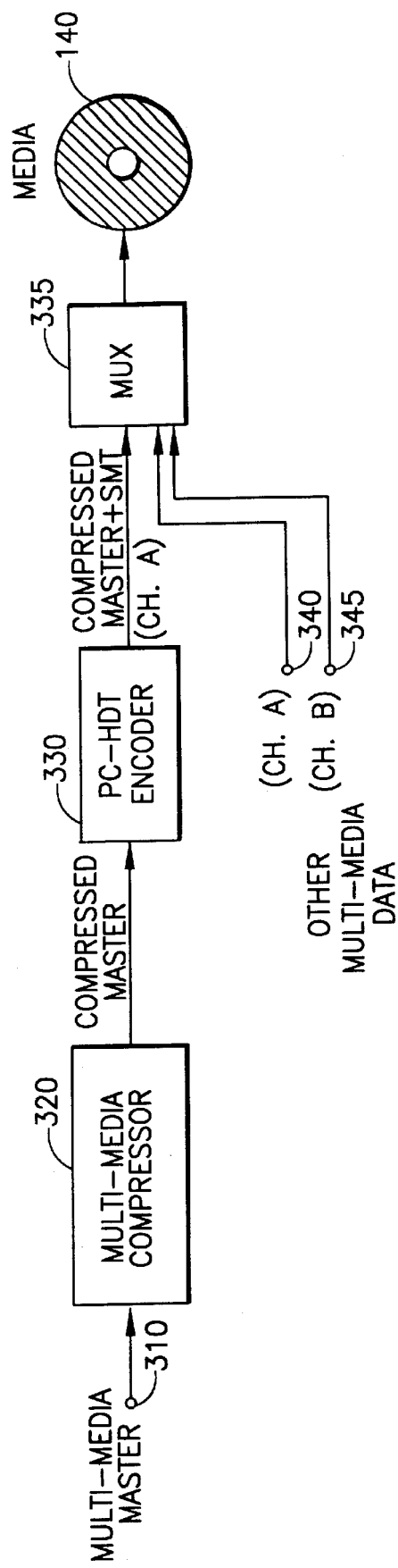
FIG. 3 is a block diagram of a master source encoding system with encoding after compression in accordance with the present invention.

FIG. 3 is a block diagram of a master source encoding system with encoding after compression in accordance with the present invention. Multi-media master data is received via a terminal 310 and provided to a multi-media compressor 320, which provides a compressed master signal to the PC-HDT encoder 330. The PC-HDT encoder 330 inserts SMT data into the compressed master signal to provide the combined signal (channel A). As discussed in connection with FIG. 2, other multi-media data which accompanies the master data may be received via terminals 340 and 345 and multiplexed with the channel A signal at multiplexer 335 for storage on the media 140.

Furthermore, SMT data may be provided both before and after compression, or after a first compression step but before a second compression step. In this manner, additional SMT data can be carried.

FIG. 4 is a block diagram of a player/recorder for use with the encoding system of FIG. 3 in accordance with the present invention. The player/recorder, shown generally at 150, receives a combined data stream from a media 140. In the embodiment shown, the data stream comprises video data and associated audio data such as might be found in a movie which is stored on a DVD. The combined data stream is demultiplexed at demultiplexer 405 to separate the video data and SMT data (channel A) from the audio data (channels B and C). SCT data may already be carried with the channel A data, for example, if the media 140 is a copy of an original media.

In this example, it is assumed that the source material which is stored on channel A of the media 140 is compressed data, and that the media 140 is a laser disc, compact disc, or DVD. Furthermore, the player/recorder 150 may have a digital compressed master multi-media output for making a digital master quality copy from the disc 140, and an analog baseband output for playing back the multi-media signal of an original disc or first or later generation copy thereof, for example via a video display.

Additionally, it is assumed that the SMT data was added to the master multi-media signal after the master multi-media signal was compressed. The SMT data can be added before and/or after compression. The schemes disclosed in U.S. Pat. No. 5,687,191 and U.S. patent application Ser. No. 08/912,434 are advantageous in this regard since they allow the recovery of SMT data from a compressed signal even when the SMT data is added prior to compression. Furthermore, it is possible to add the SCT data to the uncompressed master multi-media signal even when the SMT is carried with the compressed master multi-media signal.

The multi-media master data and SMT data from channel A of the disc 140 are provided on four different paths. Those skilled in circuit design will realize that physically distinct (e.g., logical) paths may be provided, or a common physical path may be used in a serial processing mode. For generality, the paths may be considered to be virtual paths. Additionally, functions of the decoders 425 and 430 can be implemented by a single processing engine which operates serially.

In a first path 409, the multi-media master data and SMT data are provided to an SMT decoder 430 of a decoder 420. For example, the decoder 420 may be a PC-HDT decoder. The SMT decoder 430 searches for SMT data which indicates that the material of the media 140 is copy managed in accordance with the present invention. The SMT data may also carry other information as mentioned above. A corresponding "SMT Detected" signal is then provided to the selector 435.

In a second path 408, the multi-media master data and SMT data, along with SCT data which may already be on the media 140, are provided to a SCT decoder 425 of the PC-HDT decoder 420. The SCT decoder 425 searches for existing SCT data, if any. The presence of SCT data indicates that the data stored on the media 140 is a copy of an original or subsequent generation disc. Depending on the SCT data which is detected, the SCT decoder 425 can determine the copy generation number of the media 140. For example, if the SCT data indicates that the media 140 is a second generation copy, that means that a first, original media was copied to produce a first generation copy, and the first generation copy was copied to produce the second generation copy. If there is no SCT data present, this indicates that the media 140 contains original data. A corresponding "SCT Detected" signal is sent to the selector 435 to indicate whether SCT data is present, and, if so, the nature of the SCT data.

In a third path 407, the channel A data, including the multi-media master data, SMT data, and SCT data, if present, are provided directly to the selector 435.

In a fourth path 406, the channel A data is provided to an encoder 410, which includes a Standard Copy Tag (SCT) encoder 415 which embeds SCT data into the input multi-media data stream. The multi-media data, SMT and SCT data are then provided to a selector 435. The timing of the encoded SCT can be synchronized to that of the incoming SMT and/or SCTs with or without an offset. The fourth path is optional, for example, for play-only devices which do not record.

The SMT decoder 430 and SCT decoder 425 synchronize to the incoming SMT and SCT data and may optionally pass this timing information to the SCT encoder 415 via means not shown. The SCT encoder 415 then may choose an unused offset from a predetermined set to encode the outgoing tags without overwriting existing tag data. With this scheme, all tags may be synchronous to each other relative to the PN timing if the timing information is provided to the SCT encoder 415, and no two tags will occupy the same offset (e.g., position) in the data stream which is provided from the SCT encoder 415 to the selector 435. However, tags which occupy the same position in the data stream can also be distinguishable for subsequent recovery. Generally, the PN chips of the various tags need not be synchronized, but this makes it easier for the decoder to decode the tag data. In any case, the SMTs and SCTs should be offset by at least one chip.

The selector 435 can enable or disable various outputs to player and recorder portions of the player/recorder 150. In particular, the selector 435 may include control means such as a central processing unit (CPU), digital signal processor (DSP), or the like, a memory, and switch means for selecting the desired input signal in response to the detected SCT and SMT signals. Furthermore, if the selector 435 enables the multi-media data output for recording or for playing (e.g., via a television screen, not shown), then typically the accompanying channel B or C data which are provided on paths 412 and 411, respectively, will also be enabled and output, for example, to a display device such as a the television or speakers.

However, if the channel A multi-media data is not enabled for recording or playing, then the channel B or C data may also not be enabled. Moreover, if channel A is enabled for playing but not for recording, then channels B and/or C may be enabled. Alternatively, the selector 435 may automatically enable channels B and/or C while the SCT and SMT decoders 425 and 430, respectively, are searching the compressed channel A data stream for the corresponding SCT and SMT tags.

Thus, when channel A is enabled by the selector 435, the selector 435 will output either the input multi-media data stream on path 407 or the output of the SCT encoder 415. Additionally, when the compressed channel A data is selected for playing, it will be processed by a decompressor 440 to provide an uncompressed digital or analog multi-media output at baseband (e.g., video or audio). For uncompressed multi-media data on channel A, the decompressor 440 is not required, and the encoder 410 can be an HDT encoder rather than a PC-HDT encoder.

Various operating modes of the player/recorder 150 will now be discussed in greater detail. If neither SMT nor SCT data are present in the channel A data from the media 140, then the channel A media is not copy managed in accordance with the present invention, and the channel A, B and C data streams are output by the selector 435 via input paths 407, 412 and 411, respectively. In this case, the signals can be played back and recorded an unlimited number of times without being tagged with SCT or SMT data. However, in some situations, it may be desirable for the operator of the play/record unit 150 to choose to have SMT and/or SCT data inserted into the channel A stream for private copy management purposes. For example, an individual may wish to copy protect a source media which he has modified, e.g., to create a derivative work. In this case, the player/recorder 150 essentially functions like the master source encoder 120 of FIG. 1.

If SMT data is present in the media 140 but SCT data is not, then the media is copy managed but is not a copy of an original disc. In this case, the SMT decoder will decode the SMT data to determine whether any additional generations of copies are allowed. If so, the channel A output for recording will be enabled by the selector 435. Also, the analog channel A output will be enabled. If the SMT data indicates that no additional generations of copies are authorized, then only the analog channel A output will be enabled to provide a playback capability but not a record capability. The channel B and C output streams can also be enabled in either case.

If both SCT and SMT data are present, then the source is copy managed. The number of generations of SCT data which is detected by the SCT detector 425 is compared with a Valid Copy Threshold (VCT). The VCT indicates the number of allowed copies and can be factory set into the player/recorder 150, or embedded in the SMT data. If the number of generations of SCT data is less than or equal to the VCT, then the selector 435 will enable the compressed channel A output for recording the data on another media, not shown. Otherwise, the channel A output is disabled, or only the channel B and C outputs are enabled for playback.

In an alternative embodiment of the player/recorder 150 of FIG. 4, the SMT data is detected and replaced with the SCT data. That is, the SCT data overwrites the SMT data. For example, if the SMT data of the original media indicates that one or more copies are allowed, then the SCT data will contain a generation copy number. In this case, when the SCT decoder 425 detects the presence of SCT data which has overwritten SMT data, the SCT data is modified at the SCT encoder 415 by incrementing the generation copy number. Then, if the SCT decoder 425 detects SCT data with a generation copy number that exceeds the VCT, the compressed channel A output may be disabled.

In a slightly modified version of this scheme, the SMT data is updated with new SMT data which indicates the number of remaining allowed copies. Then, each time a copy is made, this number is decremented until no additional copies are allowed.

Furthermore, when a multi-media source includes multiple channels (e.g., front left, front right, center, rear left and rear right for audio; or, left and right views for stereoscopic video), the SMT and SCT data can be embedded in one or more of the multiple channels. For example, for stereoscopic video, channel A may carry the left view with the SMT and SCT data, and channel B may carry the right view. Channel C may carry the audio. In fact, the same SCT and SMT data may be embedded in two or more different channels at the same or different times.

In a further variation, a graceful degradation capability may be added to the player/recorder 150. Specifically, in addition to placing SCT data in the outgoing channel A data stream, the player/recorder 150 may add a predetermined amount of shaped or unshaped noise to some or all of the outgoing streams (i.e., channels A–C). The purpose is to variably degrade the material as desired each time it is copied. Moreover, the amount of added noise may be correlated with the copy generation number. Thus, later generations of multi-media data will have more degradation.

Additionally, it should be appreciated that the multi-media data signal which is copy protected can be different from, or additional to, the multi-media data signal which carries the SMT and SCT tags. For example, an audio signal may carry the SMT and SCT tags to copy protect an associated video signal, which carries no tags. The audio signal itself may or may not be copy protected. Other variations will become apparent to those skilled in the art. For example, the tag data may be carried by two or more multi-media signals in a temporal pattern so that the player/recorder must switch between each signal to obtain the full tag information (e.g., five seconds on channel A, five seconds on channel B, and so forth).

In a further alternative, dummy tag data can be provided on one or more data signals, so that the player/recorder must know which tag data to ignore.

FIG. 5 is a block diagram of a multi-media data stream with a continuously encoded sequence of a standard master tag in accordance with the present invention. Time increases from left to right in FIGS. 5–14. The data stream, shown generally at 500, includes a master multi-media layer 510 (e.g., video or audio) and an SMT data layer 520 which carries a plurality of adjacent standard master tags 521–531 which comprise the same data. Moreover, the SMTs 521–531 are said to be on the same layer since they use a common PN sequence. Note that, alternatively, instead of using a number of SMTs, one continuous SMT, such as SMT 521 could be used. Generally, the SMT data can be put on the master multi-media layer 510 either in a continuous or a periodic fashion. However, continuous encoding can facilitate synchronization and detection of the SMT data at the player/recorder.

FIG. 6 is a block diagram of a multi-media data stream with a periodically encoded sequence of a standard master tag in accordance with the present invention. The data stream, shown generally at 600, includes a master multi-media layer 510 and an SMT data layer 620, which carries a plurality of periodically spaced SMTs 621 and 622 which comprise the same data. Only two SMTs are shown, but others may be provided. Moreover, the SMTs may be spaced apart at fixed or variable intervals.

Figure 7:
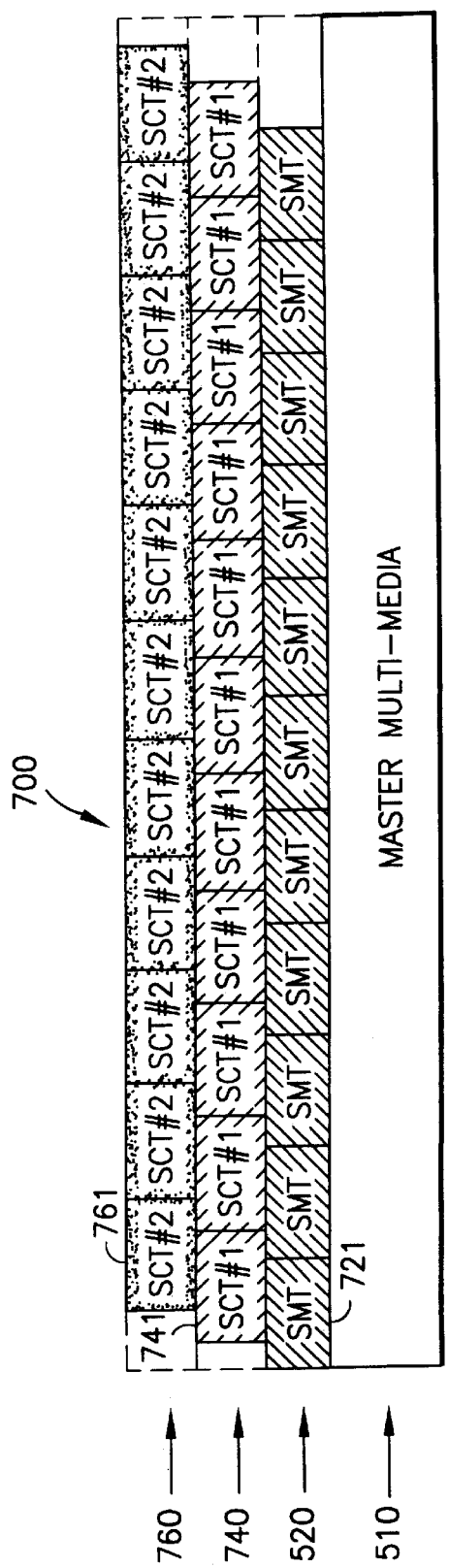
FIG. 7 is a block diagram of a multi-media data stream with a first layer having a continuously encoded sequence of a standard master tag, a second layer having a continuously encoded sequence of a first standard control tag, and a third layer having a continuously encoded sequence of a second standard control tag, in accordance with the present invention.

FIG. 7 is a block diagram of a multi-media data stream with a first layer having a continuously encoded sequence of a standard master tag, a second layer having a continuously encoded sequence of a first standard control tag, and a third layer having a continuously encoded sequence of a second standard control tag, in accordance with the present invention. The data stream, shown generally at 700, includes a master multi-media layer 510, an SMT data layer 520 with one or more SMTs including an SMT 721, a first SCT data layer 740 with a plurality of SCTs including SCT #1 shown at 741, and a second SCT data layer 760 with one or more SCTs including SCT #2 shown at 761. SCT #1 is different from SCT #2 because it uses a different PN sequence, or a time shifted version of the same PN sequence. The data stream 700 is indicative of a second generation copy that has three layers of continuously encoded tag data.

Moreover, a spread spectrum scheme such as HDT or PC-HDT that uses independent orthogonal PN sequences for each tag may be used. With this configuration, the SCT decoder will search for all the possible tags (one for each generation) and determine the generation copy of the incoming audio stream. Moreover, the same PN sequences may be used for the SMTs and the SCTs as long as the PN sequences are time-shifted versions of one another. In particular, with a time shift of one or more PN chips, each layer 520, 740 and 760 can be distinguished.

Figure 8:
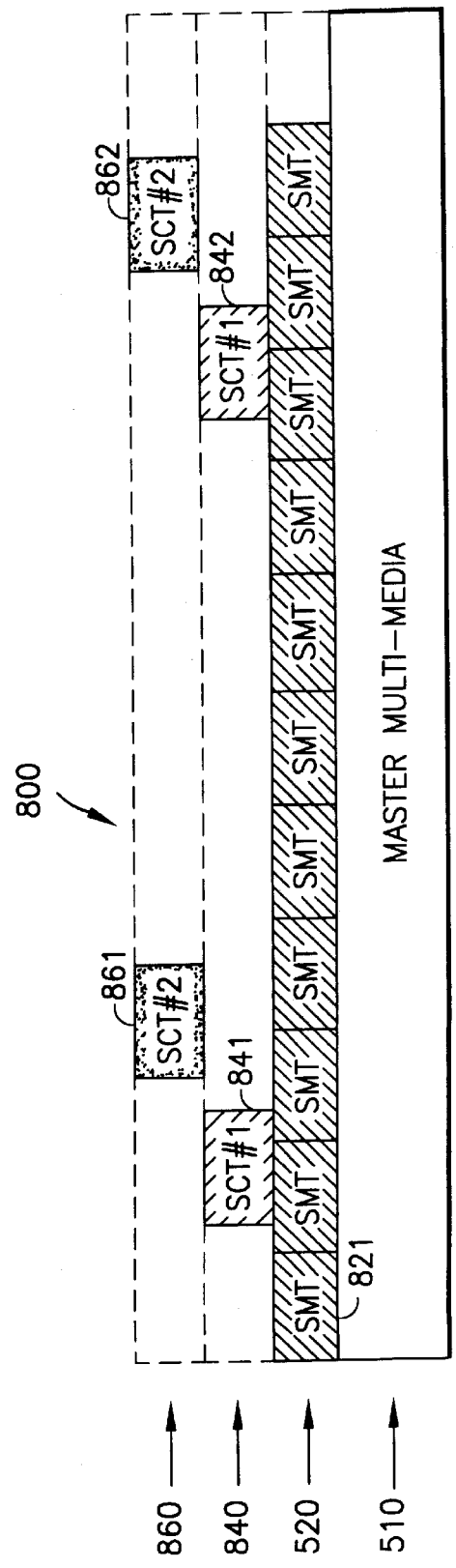
FIG. 8 is a block diagram of a multi-media data stream with a first layer having a continuously encoded sequence of a standard master tag, a second layer having a periodically encoded sequence of a first standard control tag, and a third layer having a periodically encoded sequence of a second standard control tag, in accordance with the present invention.

FIG. 8 is a block diagram of a multi-media data stream with a first layer having a continuously encoded sequence of a standard master tag, a second layer having a periodically encoded sequence of a first standard control tag, and a third layer having a periodically encoded sequence of a second standard control tag, in accordance with the present invention. The data stream, shown generally at 800, includes a master multi-media layer 510, an SMT data layer 520 with a plurality of SMTs including an SMT 821, a first SCT data layer 840 with a plurality of SCTs including SCT #1 shown at 841 and 842, and a second SCT data layer 860 with a plurality of SCTs including SCT #2 shown at 861 and 862.

The data stream 800 is indicative of a second generation copy with a continuous SMT layer and two periodic SCT layers. The SMTs and SCTs can be separated by either a fixed or a variable (including random) interval. With this configuration, the tag detection and insertion at the player/recorder can be done in a non-real time manner. This can reduce the required processing power and hardware costs.

Figure 9:
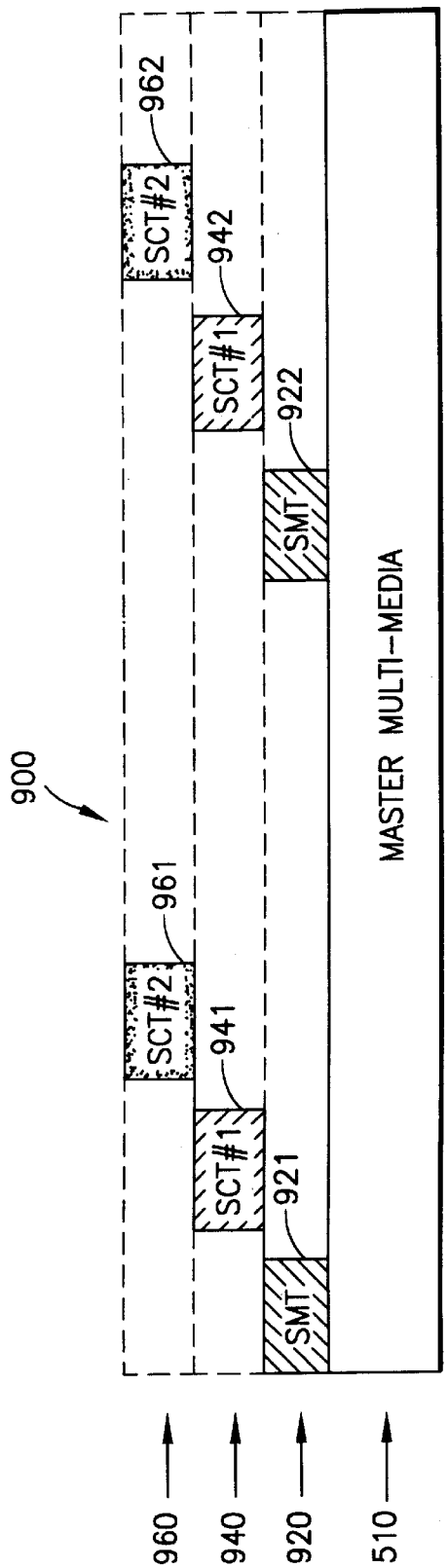
FIG. 9 is a block diagram of a multi-media data stream with a first layer having a periodically encoded sequence of a standard master tag, a second layer having a periodically encoded sequence of a first standard control tag, and a third layer having a periodically encoded sequence of a second standard control tag, in accordance with the present invention.

FIG. 9 is a block diagram of a multi-media data stream with a first layer having a periodically encoded sequence of a standard master tag, a second layer having a periodically encoded sequence of a first standard control tag, and a third layer having a periodically encoded sequence of a second standard control tag, in accordance with the present invention. The data stream, shown generally at 900, includes a master multi-media layer 510, an SMT data layer 920 with a plurality of SMTs including SMTs 921 and 922, a first SCT data layer 940 with a plurality of SCTs including SCT #1 shown at 941 and 942, and a second SCT data layer 960 with a plurality of SCTs including an SCT #2 shown at 961 and 962. The data stream 900 is indicative of a second generation copy with a periodic SMT layer and two periodic SCT layers.

Figure 10:
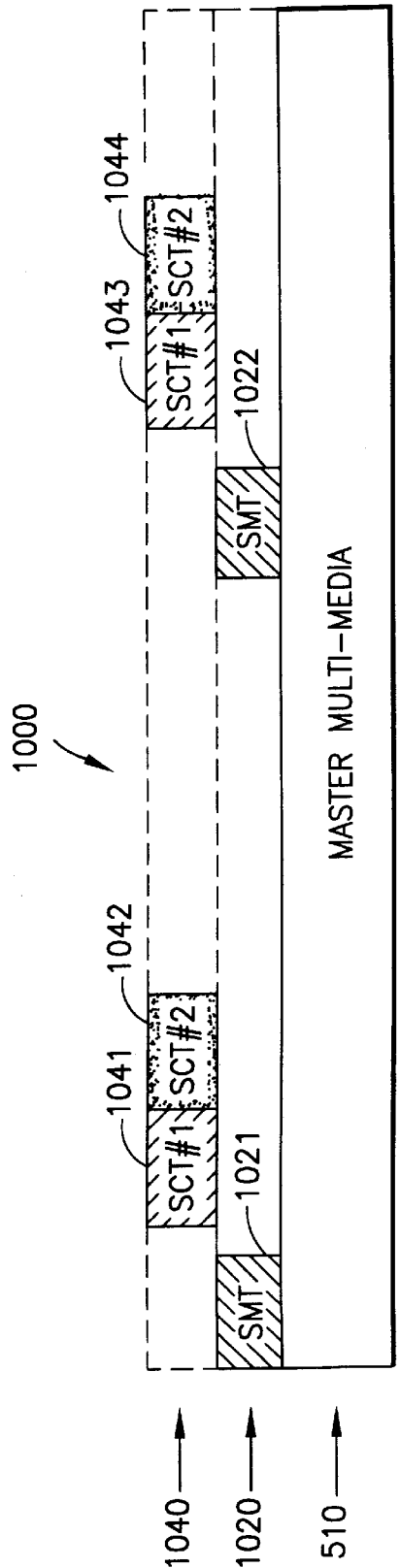
FIG. 10 is a block diagram of a multi-media data stream with a first layer having a periodically encoded sequence of a standard master tag, and a second layer having a periodically encoded sequence of first and second standard control tags, in accordance with the present invention.

FIG. 10 is a block diagram of a multi-media data stream with a first layer having a periodically encoded sequence of a standard master tag, and a second layer having a periodically encoded sequence of first and second standard control tags, in accordance with the present invention. The data stream, shown generally at 1000, includes a master multi-media layer 510, an SMT data layer 1020 with a plurality of SMTs including SMTs 1021 and 1022, and an SCT data layer 1040 with a plurality of SCTs including SCT #1 shown at 1041 and 1043, and SCT #2 shown at 1042 and 1044. The data stream 1000 is indicative of a second generation copy with a periodic SMT layer and one periodic SCT layer.

The configuration of data stream 1000 illustrates two periodic SCTs on the same layer since both SCT #1 and SCT #2 use the same PN sequence. Moreover, SCT #1 and SCT #2 can be synchronous or asynchronous to each other. In this case, the decoder counts the number of different SCTs after detecting an SMT in order to determine the generation number. Note that the SCT #1 1041 is provided in the data stream 1000 at a later time than the SMT 1021, where time increases from left to right in FIG. 10.

Figure 11:
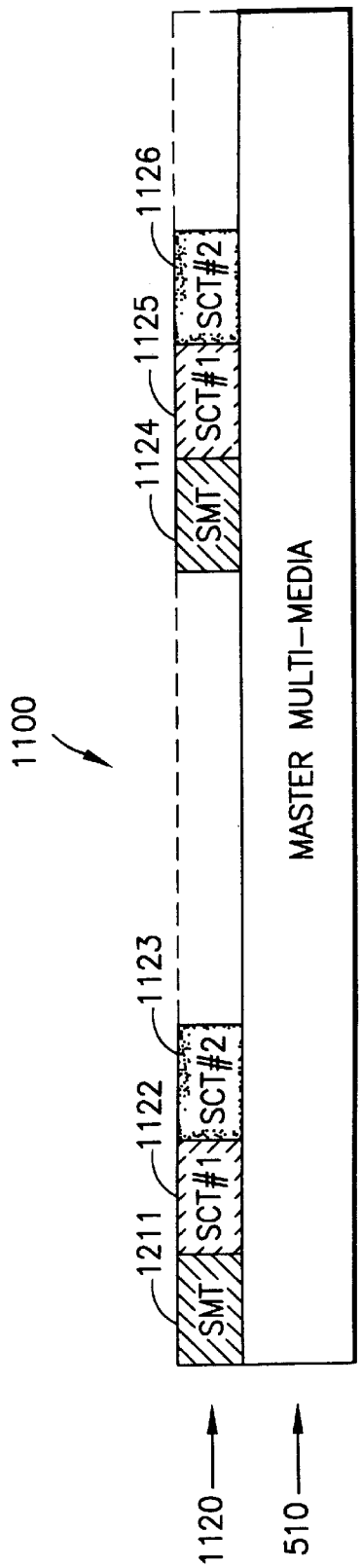
FIG. 11 is a block diagram of a multi-media data stream with a first layer having a periodically encoded sequence of a standard master tag and first and second standard control tags.

FIG. 11 is a block diagram of a multi-media data stream with a first layer having a periodically encoded sequence of a standard master tag and first and second standard control tags. The data stream, shown generally at 1100, includes a master multi-media layer 510, and a single data layer 1120 which carries a plurality of SMTs including SMTs 1121 and 1124, a plurality of SCTs including SCT #1 shown at 1122 and 1125, and SCT #2 shown at 1123 and 1126.

The configuration of data stream 1100 demonstrates having the SMT and the SCTs all in the same layer, e.g., using the same PN sequence. The tags can be synchronous or asynchronous to each other. The decoder counts the number of tags (since SMT and SCTs may look the same) in a given period of time to determine the generation number. Of course, the modulated data for each tag, if any, can be different. This scheme is desirable for reducing the required processing power in the player/recorder since there is no need to search for a large number of PN sequences or maintain a database of potential PN sequences. For synchronization, the SCT and SMT decoders can scan for the common PN sequence, and a header or synchronization pattern can be used at the beginning of each tag to distinguish the boundaries between the tags. Another way of distinguishing the tag boundaries is to provide data in each tag which indicates the packet length of the tag.

Figure 12:
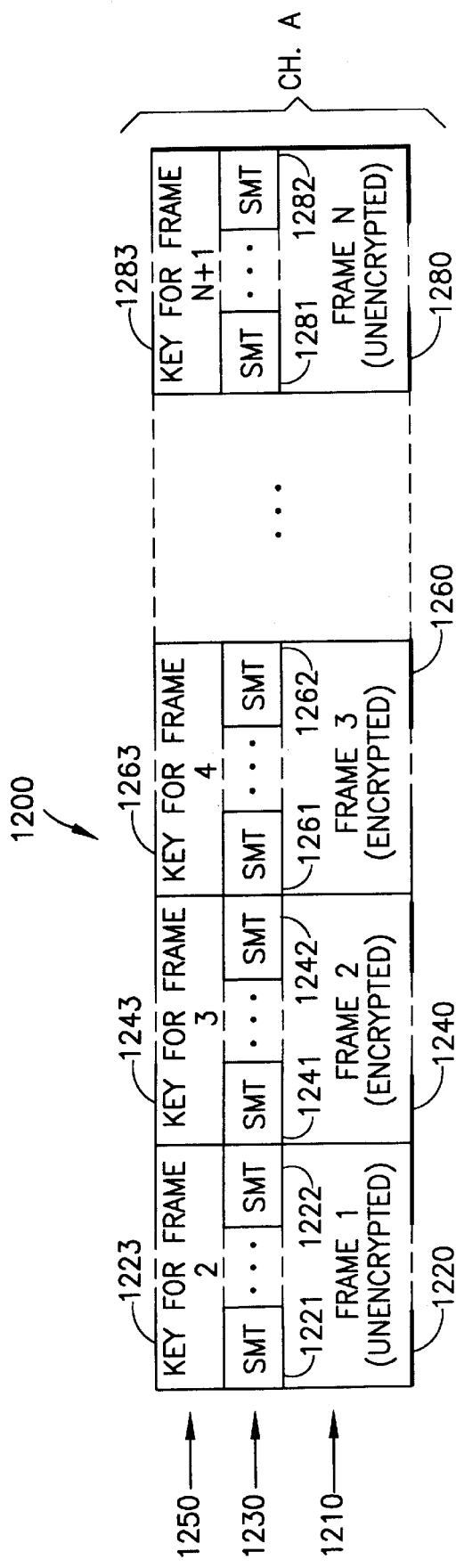
FIG. 12 is a block diagram of a multi-media data stream having a sequence of encrypted and unencrypted frames, a standard master tag layer, and an encryption key layer in accordance with the present invention.

FIG. 12 is a block diagram of a multi-media data stream having a sequence of encrypted and unencrypted frames, a standard master tag layer, and an encryption key layer in accordance with the present invention. The data stream, shown generally at 1200, includes a plurality of data frames as shown at 1210, including Frame 1 shown at 1220, Frame 2 shown at 1240, Frame 3 shown at 1260, and Frame N shown at 1280. Each frame carries one or more SMTs in a data layer 1230. For example, Frame 1 carries SMTs 1221, ..., 1222, Frame 2 carries SMTs 1241, ..., 1242, Frame 3 carries SMTs 1261, 1262, and Frame N carries SMTs 1281, ..., 1282. Additionally, encryption key data is carried in an encryption key layer 1250.

With this configuration, the source material is scrambled (e.g., encrypted) according to an encryption key, and the encryption key is embedded in the data layer 1250, which is an HDT or PC-HDT layer. Moreover, each frame (e.g., packet) 1220, 1240, 1260, 1280 can be scrambled with a different key, or the key can change every so many frames. The HDT data in a previous packet or set of packets can contain the key to be used for descrambling the next packet or set of packets. For example, in the data stream 1200, packet 1223 of Frame 1 carries the key for Frame 2, packet 1243 of Frame 2 carried the key for Frame 3, packet 1263 of Frame 3 carries the key for Frame 4 (not shown), and packet 1283 of Frame N carries the key for Frame N+1 (not shown).

Furthermore, by using null keys, one can also encrypt the frames in a random fashion. For example, in the data stream 1200, Frames 1 and N are unencrypted, while Frames 2 and 3 are encrypted.

Moreover, although the encryption scheme is most robust with a digital source, it can be extended to work with analog scrambling schemes. In addition, the player/recorder unit can provide an additional level of encryption when it receives an encrypted data stream such as a data stream 1200. In this case, the player/recorder unit that receives a data stream with multiple layers of encryption must perform a corresponding multi-level decryption process to recover each frame of the original source material.

Figure 15:
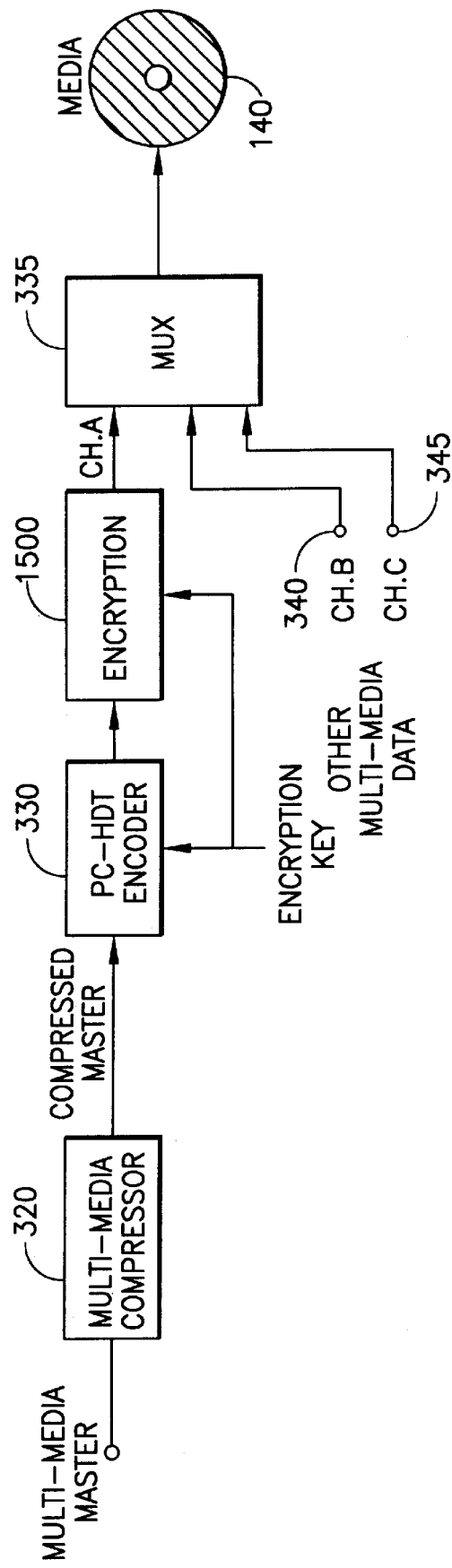
FIG. 15 is a block diagram of a master source encoding system with encoding and encryption after compression in accordance with the present invention.
Figure 16:
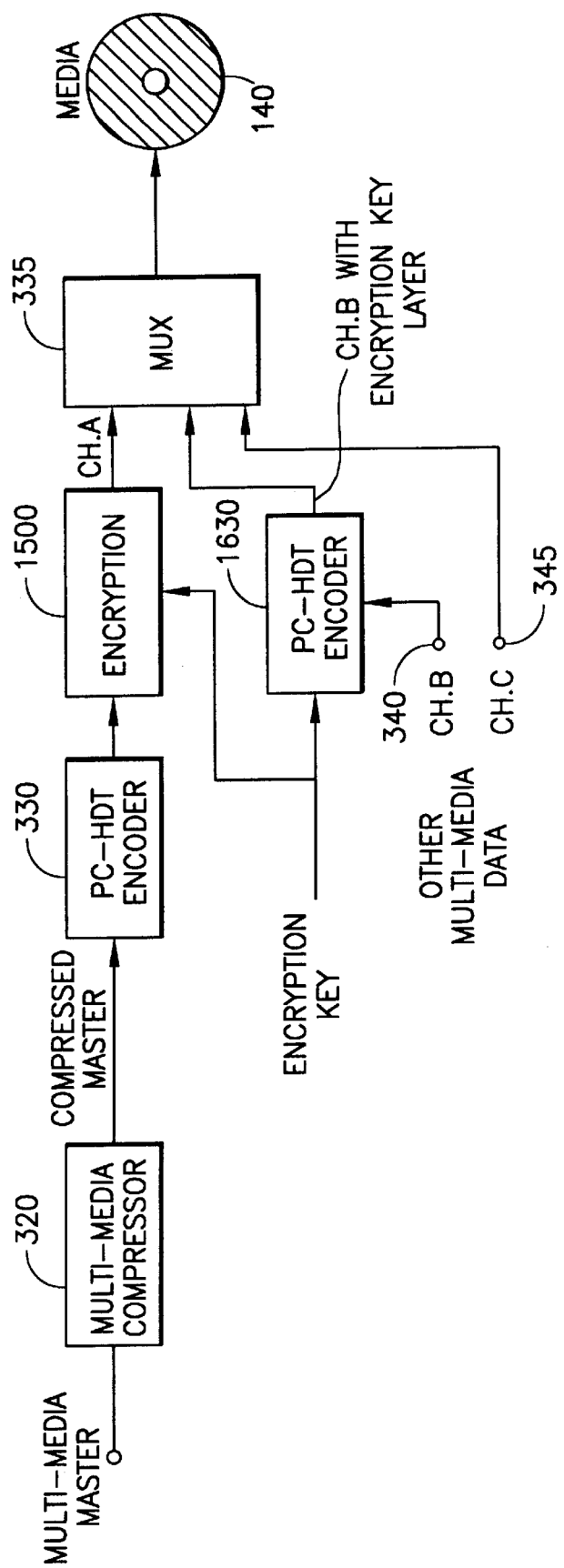
FIG. 16 is a block diagram of another embodiment of a master source encoding system with encoding and encryption after compression in accordance with the present invention.

Related apparatus are shown in FIGS. 15 and 16.

FIG. 13 is a block diagram of a multi-media data stream having a sequence of frames, and an encryption key layer for use in decoding the multi-media data stream of FIG. 14 in accordance with the present invention. FIG. 14 is a block diagram of a multi-media data stream having a sequence of encrypted and unencrypted frames, and a standard master tag layer in accordance with the present invention. In FIG. 14, the channel A data stream 1400 is the same as the data stream 1200 of FIG. 12 except the SMT layer 1230 and encryption key layer 1250 are not present.

A channel B data stream 1300 includes the SMT layer 1330, encryption key layer 1350 and a frame layer 1310. The frame layer includes packets 1320, 1340, 1360, ..., 1380. The contents of the frame data may or may not be related to the frame data of another multi-media data stream. The encryption key layer includes packets 1323, 1343, 1363, ..., 1383, which includes encryption key data for use in decrypting the frame data of another data stream. For example, packet 1323 includes encryption key data for Frame 2 (1240) of channel A (FIG. 14.), packet 1343 includes encryption key data for Frame 3 (1260) of channel A, packet 1363 includes encryption key data for Frame 4 of channel A, and packet 1383 includes encryption key data for Frame N+1 of channel A.

In the channel B data stream 1300, Frame 1 (1320) carries SMTs 1321, ..., 1322, Frame 2 (1340) carries SMTs 1341, ..., 1342, Frame 3 (1360) carries SMTs 1361, ..., 1362, and Frame N (1380) carries SMTs 1381, ..., 1382.

With the scheme shown, frames of encrypted multi-media data on a given data stream (e.g., channel A) can be decrypted using key data from a separate data stream (e.g., channel B). Specifically, an encryption key carried in the key layer 1350 can be used to decrypt one or more encrypted frames in the layer 1210. Moreover, the encrypted frames need not have any particular temporal relationship to the encryption key packets. That is, with an appropriate buffering capability, an encryption key can be used to decrypt data from previous, concurrent, and/or subsequent encrypted frames. Additionally, a single key can be used to decrypt one or more frames, or two or more keys can be used to decrypt a single frame. Furthermore, the key layer 1350 can carry one or more encryption keys, and a single encryption key can be carried in more than one packet.

The channel B data can be recorded with the channel A data on a common source media, or communicated with the channel A data in a common transport stream. Alternatively, the channel B data can be provided from a completely independent source. For example, the channel A data may comprise video which is stored on a DVD, while the channel B data comprises the accompanying audio which is obtained from a separate CD-ROM, or from the Internet. Furthermore, as mentioned, the channel A and B data streams need not have related content. For example, channel A may comprise a first video sequence, and channel B comprises a second video sequence, or audio data from a second video sequence, or other data which is unrelated to channel A.

Related apparatus is shown in FIG. 16.

FIG. 15 is a block diagram of a master source encoding system with encoding and encryption after compression in accordance with the present invention. Like-numbered elements serve the same function as those in FIG. 3. The compressed multi-media master data is output from the multi-media compressor 320 and provided to the PC-HDT encoder 330. The PC-HDT encoder provides the SMT data in an SMT layer, and the encryption key in an encryption key layer, as shown in FIG. 12.

Then, the master multi-media signal is provided to an encryption function 1500. In the embodiment shown, the multi-media master data is encrypted under the same encryption key that is carried in the key layer using known techniques to provide a compressed and encrypted master signal as channel A data to the MUX 335.

The channel A signal and, optionally, channel B and C multi-media data signals are multiplexed at multiplexer 335 and stored on the media 140. The scheme works analogously for uncompressed multi-media master data. That is, an HDT encoder is used instead of a PC-HDT encoder, and there is no need for the multi-media compressor 320.

FIG. 16 is a block diagram of another embodiment of a master source encoding system with encoding and encryption after compression in accordance with the present invention. Like-numbered elements serve the same function as those in FIG. 15. The compressed multi-media master data is output from the multi-media compressor 320 and provided to the PC-HDT encoder 330, where the SMT layer is added. The master multi-media signal is then provided to the encryption function 1500 where the signal is encrypted under an encryption key which is added as an encryption key layer in the channel B signal at a PC-HDT encoder 1630.

In particular, the PC-HDT encoder 1630 receives the encryption key along with a channel B multi-media data signal via terminal 340 to provide the encryption key as an encryption key layer, such as layer 1350 discussed in connection with FIG. 13, on the channel B multi-media data signal. Thus, the encryption key layer is provided on a multi-media data signal which is separate from the encrypted multi-media data signal.

Note that the PC-HDT encoder 1630 is shown as being separate from the PC-HDT encoder 330 for clarity, but the two elements may in fact be the same, or share common hardware. The output of the PC-HDT encoder 330, namely the compressed and encrypted master with the SMT layer (channel A), is provided to the multiplexer 335 to be combined with the channel B multi-media data with the encryption key layer. The scheme works analogously for uncompressed multi-media master data.

Figure 17:
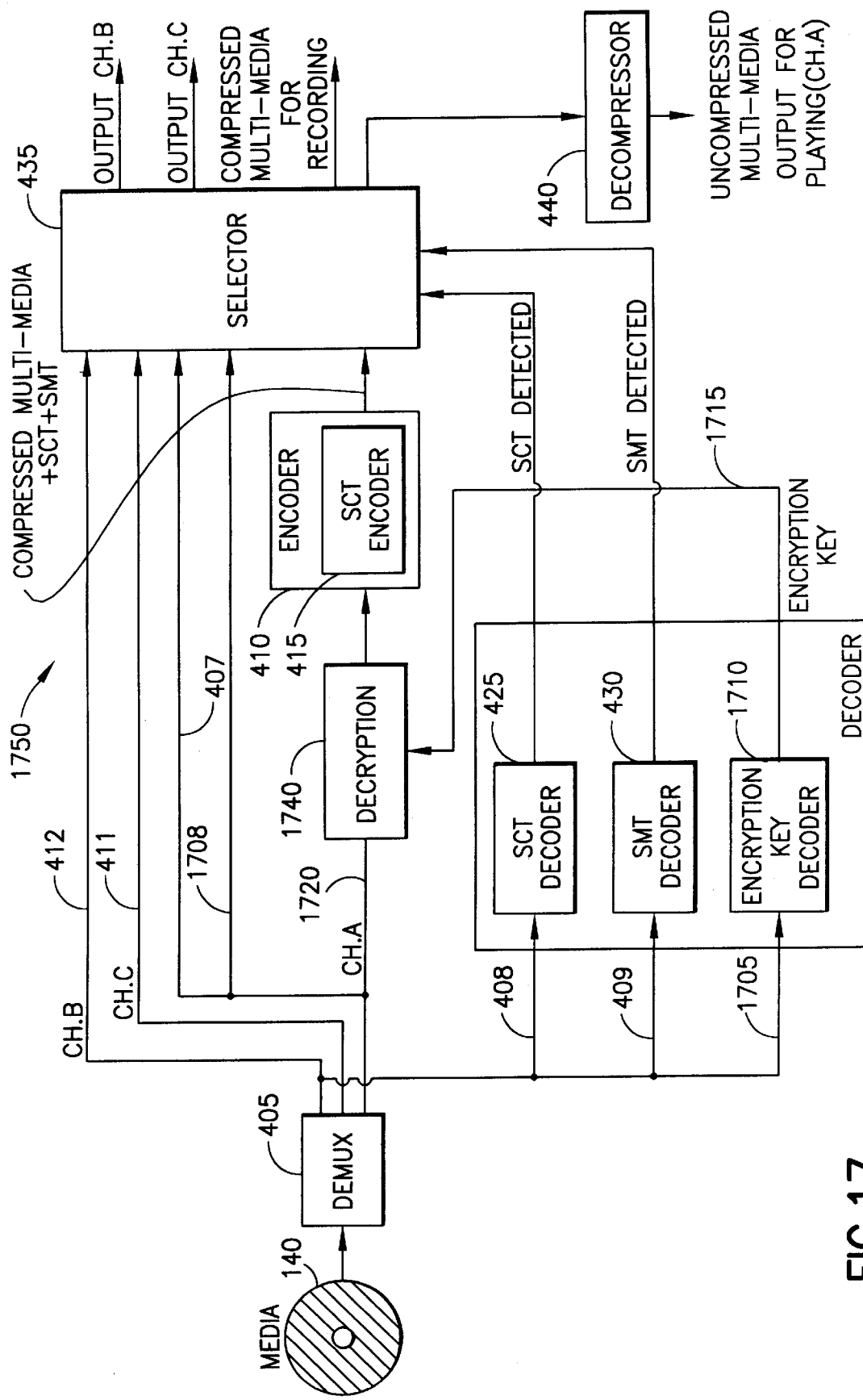
FIG. 17 is a block diagram of a player/recorder for use with the encoding system of FIG. 16 in accordance with the present invention.

FIG. 17 is a block diagram of a player/recorder for use with the encoding system of FIG. 16 in accordance with the present invention. Like-numbered elements serve the same function as those in FIG. 4. The player/recorder 1750 includes an encryption key decoder 1710 which receives the channel B data via a line 1705. The encryption key decoder 1710 recovers the encryption key in channel b in the same manner which the SMT decoder 430 recovers the SMT data, and the SCT decoder 425 recovers SCT data.

The encryption key and the encrypted channel A data are provided to a decryption function 1740 via lines 1715 and 1720, respectively, to decrypt the multi-media data in channel A. The decryption function 1740 uses a technique which reverses the encryption performed by the encryption function 1500 of FIG. 16. The clear multi-media data, along with the SMT and SCT data, if any, are then provided to the SCT encoder 415 of the encoder 410. The encrypted channel A data is provided to the selector 435 via a line 1708.

Thus, it is possible to provide the encryption key in a data stream which is not stored or carried with the multi-media master signal (channel A). By separating the sources of the encrypted multi-media data and the encryption key, security can be enhanced.

Furthermore, the player/recorder 1750 can be modified for use with the encoder of FIG. 15, where the encryption key is carried with the encrypted channel A data, by inputting the channel A data to the encryption key decoder 1710 to recover the encryption key. A single player/recorder can be adapted for use with different modes by providing appropriate switching circuitry.

In a further variation, the channel A data can be encrypted under first and second keys, where the first key is carried in the channel B data, and the second key is carried in the channel C data. Then, the player/recorder must decoder channels B and C with the encryption key decoder 1710 to recover the keys. Other variations will become apparent to those skilled in the art.

Accordingly, it can be seen that the present invention provides a system for controlling the reproduction of a multi-media data signal which is stored on a source media or distributed via a communication network. Master tag data and control tag data are inserted into the data signal, for example, according to a hidden data transport scheme. The tags may be inserted prior to, and/or after, compression of the multi-media data.

The master tag and control tag data may be provided on an auxiliary multi-media data signal which is used to control reproduction of a primary multi-media data signal. For example, master tag and control tag information may be carried by an audio signal to control reproduction of an associated video signal.

A player/recorder inserts an additional generation of control tag information each time a copy of the media is made. The master tag data and control tag data may be provided as spread spectrum signals which are spectrally shaped and power-adjusted according to the data signal to render them imperceptible in the data signal.

With encrypted multi-media data, the encryption key can be carried in an encryption key layer of the multi-media data signal itself, with another multi-media data signal which is stored with, or transmitted with, the encrypted signal, or with a data signal which is stored or transmitted independently of the encrypted signal. Successive frames of the encrypted multi-media data can be decrypted using successive, different encryption keys which are carried in packets of the encryption key layer.

Although the invention has been described in connection with various specific embodiments, those skilled in the art will appreciate that numerous adaptations and modifications may be made thereto without departing from the spirit and scope of the invention as set forth in the claims.

What is claimed is:

1. Apparatus for controlling the reproduction of a multi-media data signal using master tag information embedded therein, and which is adapted to carry control tag information embedded therein, comprising:

a receiver for receiving and detecting said master tag information embedded in said multi-media data signal, detecting said control tag information, if any, embedded in said multi-media data signal, and determining the number of generations of said control tag information;

an encoder for providing an additional generation of control tag information in said multi-media data signal; and a data output stage responsive to the number of said generations of control tag information for selectively reproducing said multi-media data signal.

2. The apparatus of claim 1, wherein:

said encoder is responsive to said master tag information for providing said additional generation of control tag information; and in the absence of master tag information in said multi-media data signal, said additional generation of control tag information is not provided.

3. The apparatus of claim 1, wherein said encoder further comprises at least one of:

(a) means for spectrally shaping said control tag information according to said multi-media data signal; and (b) means for adjusting the power of said control tag information according to said multi-media data signal.

4. The apparatus of claim 1, further comprising:

a master source encoder comprising at least one of:

(a) means for spectrally shaping said master tag information according to said multi-media data signal; and (b) means for adjusting the power of said master tag information according to said multi-media data signal.

5. The apparatus of claim 4, wherein:

at least one of said spectral shaping and power adjusting means render the master tag information at a desired level in said multi-media data signal.

6. The apparatus of claim 1, wherein:

said data output stage is prevented from reproducing said multi-media data signal when a predetermined number of generations of said control tag information is detected in the multi-media data signal;

said predetermined number being at least one.

7. The apparatus of claim 1, wherein:

said multi-media data signal includes cryptographic data embedded therein to enable the decryption of data packets carried together with said multi-media data signal.

8. The apparatus of claim 1, wherein:

said data signal comprises a plurality of data channels, and said encoder provides said control tag information and said master tag information in different ones of said data channels.

9. The apparatus of claim 1, wherein said multi-media data signal comprises:

at least one frame of multi-media data which is encrypted under an encryption key; and an encryption key layer with at least one packet containing said encryption key for decrypting said at least one frame of multi-media data frame.

10. The apparatus of claim 1, wherein:

said encoder provides said control tag information as a spread spectrum signal.

11. The apparatus of claim 1, further comprising:

a master source encoder that provides said master tag information in said multi-media data signal as a spread spectrum signal.

12. The apparatus of claim 1, wherein:

said multi-media data signal comprises compressed digital data; and said encoder provides said additional generation of control tag information without decompressing said compressed digital data.

13. The apparatus of claim 1, wherein:

said master tag information is provided as a spread spectrum signal in accordance with an associated pseudo-random sequence in at least one time segment of said multi-media data signal;

said encoder generates said control tag information as a spread spectrum signal using said associated pseudo-random sequence; and said encoder provides said control tag information in said multi-media data signal in a time segment which is unaligned relative to said at least one time segment in which said master tag information is carried.

14. The apparatus of claim 1, wherein:

at least one of said master tag information and said control tag information, if any, is provided as a spread spectrum signal in said multi-media data signal; and said encoder provides said additional generation of control tag information as a spread spectrum signal which is distinguishable from said at least one of said master tag information and said control tag information.

15. The apparatus of claim 1, wherein:

at least one of said master tag information and said control tag information, if any, is provided as a spread spectrum signal in said multi-media data signal in accordance with a first pseudo-random sequence; and said encoder provides said additional generation of control tag information as a spread spectrum signal in accordance with a second pseudo-random sequence which is distinct from said first pseudo-random sequence.

16. The apparatus of claim 1, wherein:

said encoder provides said control tag information in a plurality of non-adjacent time segments of said multi-media data signal.

17. The apparatus of claim 1, further comprising:

a master source encoder that provides said master tag information in a plurality of non-adjacent time segments of said multi-media data signal.

18. The apparatus of claim 1, wherein said encoder provides said additional generation of control tag information at a level calculated to cumulatively degrade the quality of said multi-media data signal according to said number of generations of control tag information.

19. The apparatus of claim 1, wherein:
auxiliary data is embedded in said multi-media data signal; and
said data output stage is responsive to the number of said generations of control tag information for selectively reproducing said auxiliary data.

20. The apparatus of claim 1, wherein:
a presence of at least one of said master tag information and said control tag information in defined intervals of said multi-media data signal is used to carry information in said multi-media data signal according to a binary signaling scheme.

21. The apparatus of claim 1, wherein:
said multi-media data signal comprises video data.

22. The apparatus of claim 1, wherein:
said number of generations of detected control tag information in said received data signal is at least one.

23. The apparatus of claim 1, wherein:
said encoder provides said additional generation of control tag information in said multi-media data signal such that said additional generation of control tag information replaces said master tag information.

24. The apparatus of claim 1, wherein:
said encoder is operatively associated with said receiver for degrading the quality of said received data signal such that succeeding received and encoded generations of said data signal have an increasingly degraded quality.

25. A method for controlling the reproduction of a multi-media data signal that carries master tag information embedded therein, and which is adapted to carry control tag information embedded therein, comprising the steps of:
(a) retrieving said master tag information embedded in said multi-media data signal;
(b) retrieving said control tag information, if any, embedded in said multi-media data signal;
(c) determining the number of generations of said control tag information in said multi-media data signal;
(d) determining whether the number of said generations of control tag information is below a threshold level; and:
  (i) if so, providing an additional generation of control tag information in said multi-media data signal; and,
  (ii) if not, inhibiting the reproduction of said multi-media data signal.

26. The method of claim 25, comprising the further step of:
determining said threshold level according to said master tag information.

27. The method of claim 25, comprising at least one of the further steps of:
(a) spectrally shaping said additional generation of control tag information according to said multi-media data signal; and
(b) adjusting the power of said additional generation of control tag information according to said multi-media data signal.

28. The method of claim 25, comprising at least one of the further steps of:
(a) spectrally shaping said master tag information according to said multi-media data signal; and
(b) adjusting the power of said master tag information according to said multi-media data signal.

29. The method of claim 25, wherein:
at least one of said spectral shaping and power adjusting steps render said master tag information at a desired level in said multi-media data signal.

30. The method of claim 25, wherein: said inhibiting step prevents reproduction of said multi-media data signal.

31. The method of claim 25, comprising the further step of:
providing cryptographic data embedded in said multi-media data signal to enable the decryption of data packets carried together with said multi-media data signal.

32. The method of claim 25, wherein said data signal comprises a plurality of data channels, comprising the further step of:
providing said control tag information and said master tag information in different ones of said data channels.

33. The method of claim 25, wherein said multi-media data signal comprises:
at least one frame of multi-media data which is encrypted under an encryption key; and
an encryption key layer with at least one packet containing said encryption key for decrypting said at least one frame of multi-media data frame.

34. The method of claim 25, wherein:
said additional generation of control tag information is provided as a spread spectrum signal.

35. The method of claim 25, wherein:
said master tag information is provided as a spread spectrum signal.

36. The method of claim 25, wherein:
said multi-media data signal comprises compressed digital data; and
said additional generation of control tag information is provided without decompressing said compressed digital data.

37. The method of claim 25, comprising the further steps of:
providing said master tag information as a spread spectrum signal in accordance with an associated pseudo-random sequence in at least one time segment of said data signal;
providing said additional generation of control tag information as a spread spectrum signal using said associated pseudo-random sequence; and
providing said additional generation of control tag information in said multi-media data signal in a time segment which is unaligned relative to said at least one time segment in which said master tag information is carried.

38. The method of claim 25, wherein at least one of said master tag information and said control tag information, if any, is provided as a spread spectrum signal in said multi-media data signal, comprising the further step of:
providing said additional generation of control tag information as a spread spectrum signal which is distinguishable from said at least one of said master tag information and said control tag information.

39. The method of claim 25, wherein at least one of said master tag information and said control tag information, if any, is provided as a spread spectrum signal in said multi-media data signal in accordance with a first pseudo-random sequence, comprising the further steps of:
providing additional generations of control tag information as distinct spread spectrum signals by using different pseudo-random sequences; and providing said additional generation of control tag information as a spread spectrum signal in accordance with a second pseudo-random sequence which is distinct from said first pseudo-random sequence.

40. The method of claim 25, comprising the further step of:
providing additional generations of control tag information in a plurality of non-adjacent time segments of said multi-media data signal.

41. The method of claim 25, comprising the further step of:
providing said master tag information in a plurality of non-adjacent time segments of said multi-media data signal.

42. The method of claim 25, wherein:
said step (d)(i) provides said additional generation of control tag information at a level calculated to cumulatively degrade the quality of said multi-media data signal according to said number of generations of control tag information.

43. The method of claim 25, wherein auxiliary data is embedded in said multi-media data signal, and the number of said generations of control tag information is not below said threshold level, comprising the further step of:
inhibiting the reproduction of said auxiliary data.

44. The method of claim 25, comprising the further step of:
providing at least one of said master tag information and said control tag information in defined intervals of said multi-media data signal to carry information in said data signal according to a binary signaling scheme.

45. The method of claim 25, wherein:
said multi-media data signal comprises video data.

46. The method of claim 25, wherein:
said number of generations of detected control tag information is at least one.

47. The method of claim 25, wherein:
said step (d)(i) provides said additional generation of control tag information in said multi-media data signal such that said additional generation of control tag information replaces said master tag information.

48. The method of claim 25, comprising the further step of:
degrading the quality of said multi-media signal such that succeeding encoded generations of said multi-media data signal have an increasingly degraded quality.

49. Apparatus for controlling the reproduction of a primary multi-media data signal using an auxiliary multi-media data signal, where master tag information is embedded in at least one of said primary and auxiliary multi-media data signals, and at least one of said primary and auxiliary multi-media data signals is adapted to carry control tag information embedded therein, comprising:
a receiver for receiving and detecting said master tag information embedded in said at least one of said primary and auxiliary multi-media data signals, detecting said control tag information, if any, embedded in said at least one of said primary and auxiliary multi-media data signals, and determining the number of generations of said control tag information;
an encoder for providing an additional generation of control tag information in said at least one of said primary and auxiliary multi-media data signals; and
a data output stage responsive to the number of said generations of control tag information for selectively reproducing said primary multi-media data signal.

50. The apparatus of claim 49, wherein:
said data output stage is responsive to the number of said generations of control tag information for selectively reproducing said auxiliary multi-media data signal.

51. The apparatus of claim 49, wherein:
the master tag information is embedded in said auxiliary multi-media data signal, and said auxiliary multi-media data signal is adapted to carry the control tag information embedded therein.

52. The apparatus of claim 49, wherein:
the master tag information is embedded in said primary multi-media data signal, and said auxiliary multi-media data signal is adapted to carry the control tag information embedded therein.

53. The apparatus of claim 49, wherein:
said encoder provides said additional generation of control tag information in said primary multi-media data signal.

54. The apparatus of claim 53, wherein:
said encoder provides said additional generation of control tag information at a level calculated to cumulatively degrade the quality of said primary multi-media data signal according to said number of generations of control tag information.

55. The apparatus of claim 49, wherein:
said primary and auxiliary multi-media data signals are carried on a common source media.

56. The apparatus of claim 49, wherein:
said encoder is responsive to said master tag information for providing said additional generation of control tag information; and
in the absence of master tag information, said additional generation of control tag information is not provided.

57. The apparatus of claim 49, wherein said encoder further comprises at least one of:
(a) means for spectrally shaping said control tag information according to said at least one of said primary and auxiliary multi-media data signals; and
(b) means for adjusting the power of said control tag information according to said at least one of said primary and auxiliary multi-media data signals.

58. The apparatus of claim 49, further comprising:
a master source encoder comprising at least one of:
(a) means for spectrally shaping said master tag information according to said at least one of said primary and auxiliary multi-media data signals; and
(b) means for adjusting the power of said master tag information according to said at least one of said primary and auxiliary multi-media data signals.

59. The apparatus of claim 49, wherein:
at least one of said spectral shaping and power adjusting means render the master tag information at a desired level.

60. The apparatus of claim 49, wherein:
said data output stage is prevented from reproducing said primary multi-media data signal when a predetermined number of generations of said control tag information is detected in said at least one of said primary and auxiliary multi-media data signals;
said predetermined number being at least one.

61. The apparatus of claim 49, wherein:
said at least one of said primary and auxiliary multi-media data signals includes cryptographic data embedded therein to enable the decryption of data packets carried together with said at least one of said primary and auxiliary multi-media data signals.

62. The apparatus of claim 49, wherein:

said primary multi-media data signal comprises at least one frame of multi-media data which is encrypted under an encryption key; and said auxiliary multi-media data signal comprises an encryption key layer with at least one packet containing said encryption key for decrypting said at least one frame of the primary multi-media data signal.

63. The apparatus of claim 49, wherein:

said encoder provides said control tag information as a spread spectrum signal.

64. The apparatus of claim 49, further comprising:

a master source encoder that provides said master tag information as a spread spectrum signal.

65. The apparatus of claim 49, wherein:

said at least one of said primary and auxiliary multi-media data signals comprises compressed digital data; and said encoder provides said additional generation of control tag information without decompressing said compressed digital data.

66. The apparatus of claim 49, wherein:

said master tag information is provided as a spread spectrum signal in accordance with an associated pseudo-random sequence in at least one time segment of said at least one of said primary and auxiliary multi-media data signals;

said encoder generates said control tag information as a spread spectrum signal using said associated pseudo-random sequence; and said encoder provides said control tag information in a time segment which is unaligned relative to said at least one time segment in which said master tag information is carried.

67. The apparatus of claim 49, wherein:

at least one of said master tag information and said control tag information, if any, is provided as a spread spectrum signal; and said encoder provides said additional generation of control tag information as a spread spectrum signal which is distinguishable from said at least one of said master tag information and said control tag information.

68. The apparatus of claim 49, wherein:

at least one of said master tag information and said control tag information, if any, is provided as a spread spectrum signal in accordance with a first pseudo-random sequence; and said encoder provides said additional generation of control tag information as a spread spectrum signal in accordance with a second pseudo-random sequence which is distinct from said first pseudo-random sequence.

69. The apparatus of claim 49, wherein:

said encoder provides said control tag information in a plurality of non-adjacent time segments.

70. The apparatus of claim 49, further comprising:

a master source encoder that provides said master tag information in a plurality of non-adjacent time segments of said at least one of said primary and auxiliary multi-media data signals.

71. The apparatus of claim 49, wherein:

said encoder provides said additional generation of control tag information in said auxiliary multi-media data signal.

72. The apparatus of claim 49, wherein:

a presence of at least one of said master tag information and said control tag information in defined intervals of said at least one of said primary and auxiliary multi-media data signals is used to carry information in said at least one of said primary and auxiliary multi-media data signals according to a binary signaling scheme.

73. The apparatus of claim 49, wherein:

said at least one of said primary and auxiliary multi-media data signals comprises video data.

74. The apparatus of claim 49, wherein:

said number of generations of detected control tag information is at least one.

75. The apparatus of claim 49, wherein:

said encoder provides said additional generation of control tag information in said multi-media data signal such that said additional generation of control tag information replaces said master tag information.

76. The apparatus of claim 49, wherein:

said encoder is operatively associated with said receiver for degrading the quality of said primary multi-media data signal such that succeeding encoded generations of said primary multi-media data signal have an increasingly degraded quality.

77. A method for controlling the reproduction of a primary multi-media data signal using an auxiliary multi-media data signal, where master tag information is embedded in at least one of said primary and auxiliary multi-media data signals, and at least one of said primary and auxiliary multi-media data signals is adapted to carry control tag information embedded therein, comprising the steps of:

(a) retrieving said master tag information embedded in said at least one of said primary and auxiliary multi-media data signals;

(b) retrieving said control tag information, if any, embedded in said at least one of said primary and auxiliary multi-media data signals;

(c) determining the number of generations of said control tag information;

(d) determining whether the number of said generations of control tag information is below a threshold level; and:

(i) if so, providing an additional generation of control tag information in said at least one of said primary and auxiliary multi-media data signals; and, (ii) if not, inhibiting the reproduction of said primary multi-media data signal.

78. The method of claim 77, comprising the further step of:

determining said threshold level according to said master tag information.

79. The method of claim 77, wherein:

the master tag information is embedded in said auxiliary multi-media data signal, and said auxiliary multi-media data signal is adapted to carry the control tag information embedded therein.

80. The method of claim 77, wherein:

the master tag information is embedded in said primary multi-media data signals, and said auxiliary multi-media data signal is adapted to carry the control tag information embedded therein.

81. The method of claim 80, wherein:

said step (d)(i) provides said additional generation of control tag information at a level calculated to cumulatively degrade the quality of said primary multi-media data signal according to said number of generations of control tag information.

82. The method of claim 77, wherein:

said encoder provides said additional generation of control tag information in said primary multi-media data signal.

83. The method of claim 77, wherein:

said primary and auxiliary multi-media data signals are carried on a common source media.

84. The method of claim 77, comprising at least one of the further steps of:

(a) spectrally shaping said additional generation of control tag information according to said at least one of said primary and auxiliary multi-media data signals; and (b) adjusting the power of said additional generation of control tag information according to said at least one of said primary and auxiliary multi-media data signals.

85. The method of claim 77, comprising at least one of the further steps of:

(a) spectrally shaping said master tag information according to said at least one of said primary and auxiliary multi-media data signals; and (b) adjusting the power of said master tag information according to said at least one of said primary and auxiliary multi-media data signals.

86. The method of claim 77, wherein:

at least one of said spectral shaping and power adjusting steps render said master tag information at a desired level.

87. The method of claim 77, wherein:

said inhibiting step prevents reproduction of said primary multi-media data signal.

88. The method of claim 77, comprising the further step of:

providing cryptographic data embedded in said at least one of said primary and auxiliary multi-media data signals to enable the decryption of data packets carried together with said at least one of said primary and auxiliary multi-media data signals.

89. The method of claim 77, wherein:

said primary multi-media data signal comprises at least one frame of multi-media data which is encrypted under an encryption key; and said auxiliary multi-media data signal comprises an encryption key layer with at least one packet containing said encryption key for decrypting said at least one frame of the primary multi-media data signal.

90. The method of claim 77, wherein:

said additional generation of control tag information is provided as a spread spectrum signal.

91. The method of claim 77, wherein:

said master tag information is provided as a spread spectrum signal.

92. The method of claim 77, wherein:

said at least one of said primary and auxiliary multi-media data signals comprises compressed digital data; and said additional generation of control tag information is provided without decompressing said compressed digital data.

93. The method of claim 77, comprising the further steps of:

providing said master tag information as a spread spectrum signal in accordance with an associated pseudo-random sequence in at least one time segment of said at least one of said primary and auxiliary multi-media data signals;

providing said additional generation of control tag information as a spread spectrum signal using said associated pseudo-random sequence; and providing said additional generation of control tag information in at least one of said primary and auxiliary multi-media data signals in a time segment which is unaligned relative to said at least one time segment in which said master tag information is carried.

94. The method of claim 77, wherein at least one of said master tag information and said control tag information, if any, is provided as a spread spectrum signal, comprising the further step of:

providing said additional generation of control tag information as a spread spectrum signal which is distinguishable from said at least one of said master tag information and said control tag information.

95. The method of claim 77, wherein at least one of said master tag information and said control tag information, if any, is provided as a spread spectrum signal in accordance with a first pseudo-random sequence, comprising the further steps of:

providing additional generations of control tag information as distinct spread spectrum signals by using different pseudo-random sequences; and providing said additional generation of control tag information as a spread spectrum signal in accordance with a second pseudo-random sequence which is distinct from said first pseudo-random sequence.

96. The method of claim 77, comprising the further step of:

providing additional generations of control tag information in a plurality of non-adjacent time segments of said at least one of said primary and auxiliary multi-media data signals.

97. The method of claim 77, comprising the further step of:

providing said master tag information in a plurality of non-adjacent time segments of said multi-media data signal.

98. The method of claim 77, wherein:

said encoder provides said additional generation of control tag information in said auxiliary multi-media data signal.

99. The method of claim 77, comprising the further step of:

providing at least one of said master tag information and said control tag information in defined intervals of said at least one of said primary and auxiliary multi-media data signals to carry information in said at least one of said primary and auxiliary multi-media data signals according to a binary signaling scheme.

100. The method of claim 77, wherein:

said at least one of said primary and auxiliary multi-media data signals comprises video data.

101. The method of claim 77, comprising the further step of:

wherein said number of generations of detected control tag information is at least one.

102. The method of claim 77, wherein:

said step (d)(i) provides said additional generation of control tag information in said at least one of said primary and auxiliary multi-media data signals such that said additional generation of control tag information replaces said master tag information.

103. The method of claim 77, comprising the further step of:

degrading the quality of said primary multi-media data signal such that succeeding encoded generations of said primary multi-media data signal have an increasingly degraded quality.

* * * * *